United States Patent
Marshall

(10) Patent No.: US 11,269,046 B2
(45) Date of Patent: Mar. 8, 2022

(54) PHASE-COMPARISON OF MULTI-FREQUENCY TRANSMISSIONS FOR ASSISTING THE DETERMINATION OF POSITION OR TIME

(71) Applicant: u-blox AG, Thalwil (CH)

(72) Inventor: Christopher Marshall, Reigate (GB)

(73) Assignee: u-blox AG, Thalwil (CH)

(*) Notice: Subject to any disclaimer, the term of this patent is extended or adjusted under 35 U.S.C. 154(b) by 28 days.

(21) Appl. No.: 16/755,249

(22) PCT Filed: Oct. 12, 2017

(86) PCT No.: PCT/EP2017/076114
§ 371 (c)(1),
(2) Date: Apr. 10, 2020

(87) PCT Pub. No.: WO2019/072394
PCT Pub. Date: Apr. 18, 2019

(65) Prior Publication Data
US 2020/0241105 A1    Jul. 30, 2020

(51) Int. Cl.
  *G01S 5/02* (2010.01)
  *G01S 5/06* (2006.01)
  *G01S 13/38* (2006.01)

(52) U.S. Cl.
  CPC .............. *G01S 5/021* (2013.01); *G01S 5/06* (2013.01); *G01S 13/38* (2013.01)

(58) Field of Classification Search
  CPC .......... G01S 5/021; G01S 5/06; G01S 13/38
  USPC ........................................ 342/463, 450, 458
  See application file for complete search history.

(56) References Cited

U.S. PATENT DOCUMENTS

| | | | |
|---|---|---|---|
| 8,421,676 B2 | 4/2013 | Moshfeghi | |
| 2004/0260506 A1 | 12/2004 | Jones et al. | |
| 2009/0325598 A1* | 12/2009 | Guigne | G01S 5/06 455/456.1 |
| 2016/0161590 A1 | 6/2016 | Sadr et al. | |

OTHER PUBLICATIONS

International Search Report and Written Opinion issued by the European Patent Office in International Application No. PCT/EP2017/076114, dated Sep. 18, 2018, (23 pages).

* cited by examiner

*Primary Examiner* — Bo Fan
(74) *Attorney, Agent, or Firm* — Finnegan, Henderson, Farabow, Garrett & Dunner LLP

(57) ABSTRACT

Methods and apparatus for assisting positioning or timing calculations. In one aspect the invention provides a method for assisting a determination of a position or a time, the method comprising: obtaining first phase information, the first phase information characterizing a first phase of a first wireless signal transmitted by a transmitter at a first frequency and received by a first receiver at a first location; and obtaining second phase information, the second phase information characterizing a second phase of a second wireless signal transmitted by the transmitter at a second, different frequency and received by a second receiver at a second, different location. The method further comprises comparing the first phase information with the second phase information to produce phase comparison information; and using the phase comparison information to assist in the determination of a position or a time.

20 Claims, 11 Drawing Sheets

PHASE-COMPARISON OF MULTI-FREQUENCY TRANSMISSIONS FOR ASSISTING THE DETERMINATION OF POSITION OR TIME

This is application is a U.S. National Phase entry under 35 U.S.C. § 371 from PCT International Application No. PCT/EP2017/076114, filed Oct. 12, 2017, from which this application claims priority and is incorporated herein by reference.

FIELD OF THE INVENTION

This invention relates to positioning and/or timing determination. It relates in particular to the determination of position and/or time by observing the phases of wireless signals at different frequencies, emanating from the same source (transmitter).

BACKGROUND OF THE INVENTION

Positioning using Global Navigation Satellite Systems (GNSS), such as the Global Positioning System (GPS) is known. Traditionally, the calculation of position relies on trilateration, based on the time of arrival of signals from multiple different satellites. In the case of GPS, for example, satellite signals in the L1 band are conventionally used for the trilateration. The GPS satellites also transmit a signal in the L2 band, which is traditionally used for measuring ionospheric error.

With all positioning systems, it would be desirable to increase the positioning accuracy. GNSS systems in particular also suffer from the problem of availability: there are many environments in which it is difficult or impossible to receive satellite signals reliably—especially in dense urban environments or indoors. It would therefore be desirable to develop a positioning system that offers greater coverage and can calculate position in circumstances when traditional GNSS positioning would fail or become unreliable.

PCT/EP2017/058892, filed by the present applicant on 12 Apr. 2017 (and published on or after the filing date of the present application), describes an approach in which a receiver receives two wireless signals transmitted at different frequencies by two different transmitters at two different locations. The phases of these two signals upon arrival at the receiver are compared and the result of the comparison is used, along with an associated measurement reference time, to assist in the calculation of a position and/or a time.

SUMMARY OF THE INVENTION

According to a first aspect of the present invention, there is provided a method for assisting a determination of a position and/or a time, the method comprising:

obtaining first phase information, the first phase information characterizing a first phase of a first wireless signal transmitted by a transmitter at a first frequency and received by a first receiver at a first location;

obtaining second phase information, the second phase information characterizing a second phase of a second wireless signal transmitted by the transmitter at a second frequency and received by a second receiver at a second location, wherein the second frequency is different from the first frequency and the second location is different from the first location;

comparing the first phase information with the second phase information to produce phase comparison information; and using the phase comparison information to assist in the determination of a position and/or a time.

The present inventor has recognised that, surprisingly, it is possible to modify the approach of PCT/EP2017/058892 so that, instead of using two transmitters and one receiver, the system can operate with a single transmitter (transmitting on two frequencies) and two separate receivers. Although the practical implementation of this modified approach is quite different from PCT/EP2017/058892, many of the underlying mathematical equations are essentially the same.

The transmitter may comprise a single transmitter that is able to transmit over a wide enough bandwidth that it can accommodate both the first frequency and the second frequency. Alternatively, the transmitter may comprise a single transmitter that can be tuned to transmit at the first frequency in a first time interval and can be tuned to transmit at the second frequency in a second time interval. Note that the first wireless signal and the second wireless signal need not be transmitted simultaneously, in general. In another alternative, the transmitter may comprise two transmitters—one transmitter for transmitting at the first frequency and another transmitter for transmitting at the second frequency. These two transmitters may share some components (though this is not essential). For example, the two transmitters may share one or both of: a common antenna and a common power amplifier. The two transmitters are located at most 10 m apart, more preferably at most 5 m apart, still more preferably at most 1 m apart. The two transmitters may be two transmitters of the same base station, for example.

Here, the "phase" of a signal refers to a carrier phase—that is, a phase of a carrier signal. The first phase information thus at least characterises the carrier phase of the first wireless signal upon its arrival at the first receiver. Likewise, the second phase information at least characterises the carrier phase of the second wireless signal upon its arrival at the second receiver.

Using phase-relationships between signals at different frequencies from a common source to assist in positioning (or timing determination) can have several potential benefits. It can allow more measurements to be used for positioning purposes, because additional measurements can be created from pairs of signals which are transmitted at respective pairs of different frequencies. This can increase both coverage and precision. The positioning precision can also be improved by using signals that extend over a wider frequency range, because the phase-comparison provides a greater effective measurement bandwidth.

The position to be determined may be a position of one of the first and second receiver, or a position of the transmitter. The time to be determined may be a time at the transmitter or a time at one of the receivers. The determined time may be used to correct a local clock of the device for which it is determined.

The position may be the position of the transmitter when it transmitted the first wireless signal and the second wireless signal. That is, the first and second radio signals may have been transmitted at substantially the same position and time. Here, substantially the same position preferably means that the position has changed by less than 10 m, more preferably by less than 5 m, most preferably by less than 1 m. Accordingly, the time whose determination is assisted may be the time at which the first wireless signal and the second wireless signal were transmitted. However, it is possible that the transmitter changes position between transmitting the first wireless signal and transmitting the second wireless signal (for example, if the transmitter is mounted on a vehicle). This need not affect the ability to calculate the position—in particular, if a displacement vector describing the change of position is known. Similarly, it is possible that the receivers receive the respective wireless signals at different times. Again, this need not affect the ability to calculate the position—in particular, if the time difference is known.

The phase comparison information may comprise a difference between the first phase information and the second phase information.

The method may comprise associating at least one measurement reference time with each of the obtained first and second phase information, optionally using a local clock of each receiver, followed by using the at least one measurement reference time to assist in the calculation of the position and/or the time.

The phase of each signal evolves constantly over time. And, because the signals are at different frequencies, the phase difference between them evolves constantly as well. The measurement reference time associated with the phase information is the time at which the phase information is valid—that is, the time at which each signal has the given phase or the time at which the signals have the given phase difference between them (preferably according to the local clock).

In some cases, the phase comparison information may be calculated as a phase difference between phases that were measured at different times. To do this, one or both of the phases can be projected forwards or backwards in time so that they both refer to a common time reference. Once referenced to this common time reference, the phases may be compared by subtracting one phase from the other.

The measurement reference time may be determined by a local clock of the receiver. The measurement reference time may be recorded and associated with the phase information.

In some embodiments, the first phase information may consist solely of the measured first phase and the second phase information may consist solely of the measured second phase. In some embodiments, the first phase information may comprise a phase-comparison between the first wireless signal and a first reference signal. The second phase information may comprise a phase-comparison between the second wireless signal and a second reference signal. The first reference signal and second reference signal may be the same signal, or may at least be transmitted by a common transmitter or derived from a common transmitter (for example, a scaled frequency locked to GNSS).

In some embodiments, the time at the transmitter is known and the method uses the phase comparison information to assist in determining the position of the transmitter. For example, the local clock at the transmitter may be synchronised to a GNSS timing reference.

In other embodiments, the position of the transmitter is known and the method uses the phase comparison information to assist in determining the time at the transmitter.

In still other embodiments, both the position and the time are unknown, and the method uses the phase-comparison to assist in a joint determination of the position and time.

Alternatively, in some embodiments, the position and/or time to be determined are the position of and/or time at one of the receivers. Again, one of the position and time may be known and the other may be desired to be determined.

The step of using the phase comparison information may be performed by a server computer, which communicates with the receivers over a communications network.

When the goal is to calculate the position or time of the transmitter, the method may further comprise obtaining additional information, comprising one or more of: the location of the first receiver; the location of the second receiver; or the location of the first receiver relative to the second receiver.

If the goal is to calculate the position or time of one of the receivers, then the location of the other receiver and the location of the transmitter may be known and the method may further comprise obtaining these locations, or relative locations.

The phase comparison information may include an ambiguity and the step of using it to assist in the calculation of the position and/or the time may comprise resolving the ambiguity.

The ambiguity may comprise an integer number of cycles (periods) at a difference-frequency, which is the difference between the first frequency and the second frequency.

Using the phase comparison information to assist in the calculation of the position and/or the time may comprise constructing a first equation that defines a locus in position and time.

The first equation may relate the phase comparison information to: a first distance between the transmitter and the first receiver; a second distance between the transmitter and the second receiver; and optionally at least one time. In some embodiments, the at least one time may be determined using a local clock of one of the devices. In some embodiments, it may be an unknown to be determined in the course of the method. When the time is determined in the course of the method, it may be defined relative to an external reference, such as a GNSS timing reference.

The first equation can include: at least one first term in which the first distance is scaled by the first frequency; and at least one second term in which the second distance is scaled by the second frequency.

In some embodiments, scaling by frequency may be achieved by inversely scaling by wavelength, because the two signals are assumed to travel at the same speed—namely, the speed of light, c.

In the first equation, the phase comparison information is preferably neither scaled by the wavelength nor scaled inversely by the frequency.

The first equation can optionally be decomposed into: a third term in which a difference between the first and second distances is scaled by a sum of the first and second frequencies; and a fourth term in which a sum of the first and second distances is scaled by a difference between the first and second frequencies.

The locus in position and time may comprise a locus of positions at which the transmitter could be located, or a locus of positions at which one of the receivers could be located, depending on which device is the target whose position it is desired to calculate.

The locus of positions may comprise a set of curves. The curves may be non-intersecting. The set of curves may have some elliptic and some hyperbolic properties—that is, they may exhibit some combination of hyperbolic and elliptical variation. In particular, each curve in the set of curves may pass through the intersections of a set of ellipses with a set of hyperbolae. The ellipses are parameterised by the sum of the first and second distances. The hyperbolae are parameterised by the difference between the first and second distances. The different curves in the set of curves arise from an ambiguity in the phase-comparison, because it is not known which cycle (period) of the first wireless signal has been compared with which cycle (period) of the second wireless signal. This causes an integer-ambiguity in the phase comparison information. Each curve in the set of curves is a locus of positions representing one possible resolution of this integer-ambiguity. That is, if the ambiguity were to be resolved, the locus of positions would reduce to a single curve.

The method optionally further comprises: constructing one or more further equations each of which defines a further locus in position and time; and solving the first equation and the one or more further equations together, to calculate the position and/or time.

This can comprise solving a set of simultaneous equations.

One or both of the following may be true: the first phase information is obtained from the first receiver; and the second phase information is obtained from the second receiver.

At least one of the first wireless signal and the second wireless signal may be received by the respective receiver at a respective measurement reference time, wherein the method comprises using the phase comparison information and the at least one measurement reference time to assist in the determination of the position and/or the time.

The first receiver may be comprised in a first wireless communications device, the first wireless communications device further comprising a second transmitter. The first phase information optionally further characterizes a phase of a first return signal, received at the transmitter from the first wireless communications device, wherein the first return signal is transmitted by the second transmitter, the first phase information comprising one or both of: a phase difference at the first wireless communications device between the reception of the first wireless signal and the transmission of the first return signal; and a phase difference at the transmitter between the reception of the first return signal and the transmission of the first wireless signal, the method comprising using the phase comparison information to assist in the determination of a position.

The first return signal is preferably transmitted at the first frequency.

This approach allows the phase to be measured in a "round-trip" fashion, based on one transmission from the transmitter to the first wireless communications device and another transmission from the first wireless communications device to the transmitter. Comparing the phases of two signals in opposite directions, like this, is one advantageous way to relate phase measurements that are made by different devices.

In general, the first return signal may be transmitted before or after the first wireless signal. In some embodiments, the first return signal may be transmitted in response to the first wireless signal (or vice versa), but this is not essential.

In some embodiments the first return signal is transmitted by the second transmitter in response to the first wireless signal and with a known phase relative to the first wireless signal.

In the case where the first return signal is transmitted in response to the reception of the first wireless signal, the phase-difference between them may be predetermined. That is, the second transmitter may transmit the first return signal with a predetermined phase relationship relative to the phase of the received first wireless signal at the first receiver. The phase relationship is thus known because it is predetermined. Alternatively, the phase relationship might not be predetermined but may be reported by the first wireless communications device.

In some embodiments, the first wireless signal is transmitted by the transmitter in response to the first return signal and with a known phase relative to the first return signal. In this case, the "round-trip" measurement may be initiated by the first wireless communications device. In a manner analogous to that described above, the phase-difference between the arrival of the first return signal and the transmission of the first wireless signal may be predetermined. Alternatively, this phase difference might not be predetermined but may be reported by the transmitter.

Note that all aspects of the "round-trip" approach summarised above may be applied similarly to the second phase information and second receiver. Alternatively, a phase reference may be supplied for the second phase information by other means (most preferably by one of the other approaches described herein).

One or both of the following may be true: the first phase information comprises a phase-comparison at the first receiver between the first phase and a first reference phase of a reference signal at the first receiver; and the second phase information comprises a phase-comparison at the second receiver between the second phase and a second reference phase of a reference signal at the second receiver.

The reference signal at each receiver may be derived from a common source. In some embodiments, a single reference signal may be received at both receivers. In this way, both receivers compare phases directly with the same reference signal. Alternatively, each receiver may derive its own reference signal from a common master signal that is received at both receivers. In this way, the receivers are effectively comparing phases indirectly with the common master signal.

The use of a reference signal provides another way to supply a reference for the necessary phase measurements. Either or both of the first phase information and the second phase information may rely on this reference. If one of them relies on this reference, the other may rely on a reference supplied by a different approach (most preferably, one of the other approaches described herein).

The reference signal may be transmitted by a reference transmitter at a third frequency, different from the first frequency and the second frequency.

The first phase information may comprise a phase-comparison at the first receiver between the first phase and a third phase of a third wireless signal transmitted by a further transmitter at the first frequency and received at the first receiver, the method comprising using the phase comparison information to assist in the determination of a position.

Likewise, the second phase information may comprise a phase-comparison at the second receiver between the second phase and a fourth phase of a fourth wireless signal transmitted by the further transmitter at the second frequency and received at the second receiver.

In each case, the measurements of the signals from the further transmitter can provide a convenient reference for the respective phase information. Once again, this approach to providing a reference for one of the signals may be combined with one of the other approaches described herein for the other signal.

The method may further comprise obtaining calibration information, wherein the step of using the phase comparison information to assist in the calculation of the position and/or the time also uses the calibration information, wherein the calibration information comprises at least one of: a phase of the first wireless signal and a phase of the second wireless signal, at respective associated calibration reference times; and a phase-offset between the first wireless signal and the second wireless signal, at an associated calibration reference time.

In this case, the calibration information may provide the desired reference for allowing the first phase information and second phase information to be compared.

The calibration information may be obtained from a database—for example, a database provided and maintained according to the fourth aspect of the invention, summarised below.

The method may further comprise: measuring a first time-of-arrival of the first wireless signal at the first receiver; measuring a second time-of-arrival of the second wireless signal at the second receiver; and using the measured first and second times of arrival to assist in the calculation of the position and/or time.

The method may further comprise: obtaining Doppler information, said obtaining comprising determining a rate of change of the phase comparison information, wherein the Doppler information comprises the determined rate of change; and using the obtained Doppler information to assist in the calculation of a velocity or timing drift.

The velocity to be determined may be a velocity of the transmitter or a velocity of the first receiver or second receiver. Likewise, the timing drift to be determined may be a timing drift at the transmitter or a timing drift at one of the receivers. The timing drift in question may be a drift of a local oscillator of the relevant transmitter or receiver.

The Doppler information preferably comprises or consists of a rate of change (over time) of a phase difference between the first phase and the second phase.

According to another aspect, there is provided a method for assisting a determination of a velocity and/or a timing drift, the method comprising:
obtaining Doppler information, the Doppler information characterising a rate of change of a phase difference between a first wireless signal and a second wireless signal,
wherein the first wireless signal is transmitted by a transmitter at a first frequency and received by a first receiver and the second wireless signal is transmitted by the transmitter at a second frequency and received by a second receiver, wherein the second frequency is different from the first frequency, the method further comprising using the obtained Doppler information to assist in the calculation of the velocity or timing drift.

Obtaining the Doppler information may comprise: obtaining first phase change information, the first phase change information characterizing a first phase change of the first wireless signal; obtaining second phase change information, the second phase change information characterizing a second phase change of the second wireless signal; and comparing the first phase change information with the second phase change information to produce the Doppler information.

According to a second aspect of the invention, there is provided a method of producing calibration information, the method comprising:
receiving at a receiver a first wireless signal transmitted at a first frequency by a transmitter;
receiving at the receiver a second wireless signal transmitted at a second frequency by the transmitter, wherein the second frequency is different from the first frequency,
wherein each signal is received at a known distance from the transmitter at a known calibration time,
the method further comprising producing calibration information, said producing comprising at least one of:
measuring a first phase of the received first wireless signal and a second phase of the received second wireless signal, wherein the calibration information comprises the measured first phase and the measured second phase, and
determining a phase-offset between the first wireless signal and the second wireless signal, wherein the calibration information comprises the determined phase-offset,
the calibration information further comprising at least one associated calibration reference time and comprising the known distance for each signal.

In this way, the calibration information may be produced by a receiver remote from the transmitter.

The calibration reference time may refer to a time at which the first wireless signal and the second wireless signal have the measured first phase and second phase, respectively. Alternatively, the calibration reference time may refer to a time at which the first wireless signal and the second wireless signal have the determined phase-offset between them.

The calibration location is preferably known, at least relative to the transmitter.

According to a third aspect of the invention, related to the second aspect, there is provided a method of producing calibration information for a first wireless signal transmitted at a first frequency by a transmitter and a second wireless signal transmitted at a second frequency by the transmitter, wherein the second frequency is different from the first frequency, the method comprising at least one of:
obtaining at the transmitter a first phase of the transmitted first wireless signal and a second phase of the transmitted second wireless signal, wherein the calibration information comprises the measured first phase and the measured second phase, and
obtaining at the transmitter a phase-offset between the first wireless signal and the second wireless signal, wherein the calibration information comprises the determined phase-offset,
the calibration information further comprising at least one associated calibration reference time.

In some embodiments, the step of obtaining the first phase and the second phase may comprise measuring them. In some embodiments, the step of obtaining the phase-offset may comprise determining it.

Such a method may be conveniently performed by a device coupled to the transmitter. Thus, it can allow an existing transmitter to be retrofitted with a device that converts it for use in embodiments of the present invention.

In other embodiments, it may be unnecessary to measure the first phase and the second phase, or determine the phase-offset, because the method is performed by the transmitter itself and the transmitter controls these phases and the phase-offset.

According to a fourth aspect of the invention, there is provided a method of providing calibration information for assisting a determination of a position and/or a time, the method comprising:
maintaining a database of calibration information, the calibration information comprising at least one of:
phases, at calibration reference times, of pairs of first and second wireless signals, each pair of first and second signals being transmitted by a transmitter at a respective pair of first and second frequencies, the first and second frequencies being different from one another, and phase-offsets, at calibration reference times, between such pairs of first and second wireless signals;

receiving a request for calibration information, wherein the request identifies a transmitter whose calibration information is required;

searching the database to find the calibration information of the identified transmitter; and providing the found calibration information in response to the request.

According to a fifth aspect of the invention, there is provided a method of transmitting wireless signals for assisting a determination of a position and/or a time, the method comprising:

receiving a request to transmit wireless signals, the request including a predetermined phase difference and a predefined time; and in response to the request:

transmitting, by a transmitter, a first wireless signal at a first frequency; and transmitting, by the transmitter, a second wireless signal at a second frequency, different from the first frequency, wherein the first wireless signal and the second wireless signal are transmitted so as to have the predetermined phase difference between them at the predefined time.

The first frequency optionally differs from the second frequency by at least 2 kHz, preferably at least 100 kHz, more preferably at least 1 MHz, most preferably at least 10 MHz.

The first wireless signal and the second wireless signal may be transmitted by the transmitter at the same time or different times.

The transmitter may be a terrestrial transmitter or a non-terrestrial (for example, satellite or airborne) transmitter.

According to still another aspect of the invention there is provided a computer program comprising computer program code adapted to control an electronic device to perform all the steps of one of the methods summarised here if said program is run on a processor of said electronic device. Also provided is such a computer embodied on a non-transitory computer readable medium.

According to the second aspect of the invention there is also provided an electronic device configured to produce calibration information for assisting in a determination of a position and/or a time, the electronic device comprising:

a first receiver, configured to receive a first wireless signal transmitted at a first frequency by a transmitter;

a second receiver, configured to receive a second wireless signal transmitted at a second frequency by the transmitter, wherein the second frequency is different from the first frequency, wherein each signal is received at a known distance from the transmitter at a known calibration time, and a processor, configured to produce calibration information, by at least one of:

measuring a first phase of the received first wireless signal and a second phase of the received second wireless signal, wherein the calibration information comprises the measured first phase and the measured second phase, and determining a phase-offset between the first wireless signal and the second wireless signal, wherein the calibration information comprises the determined phase-offset, the calibration information further comprising at least one associated calibration reference time and comprising the known distance for each signal.

According to the third aspect of the invention there is also provided an electronic device configured to produce calibration information for assisting in a determination of a position and/or a time, the electronic device comprising:

a first input for coupling to a transmitter and obtaining a first wireless signal being transmitted at a first frequency by the transmitter;

a second input for coupling to the transmitter and obtaining a second wireless signal being transmitted at a second frequency by the transmitter, wherein the second frequency is different from the first frequency; and a processor, configured to produce calibration information, by at least one of:

measuring a first phase of the transmitted first wireless signal and a second phase of the transmitted second wireless signal, wherein the calibration information comprises the measured first phase and the measured second phase, and determining a phase-offset between the transmitted first wireless signal and the transmitted second wireless signal, wherein the calibration information comprises the determined phase-offset, the calibration information further comprising at least one associated calibration reference time.

According to the fifth aspect of the invention, there is also provided an electronic device operable to assist in a determination of a position and/or a time, the electronic device comprising:

an interface, configured to receive a request to transmit wireless signals, the request including a predetermined phase difference and a predefined time; and a transmitter, configured to, in response to the request:

transmit a first wireless signal at a first frequency; and transmit a second wireless signal at a second frequency, different from the first frequency, wherein the transmitter is configured to transmit the first wireless signal and the second wireless signal so as to have the predetermined phase difference between them at the predefined time.

According to a sixth aspect of the invention, there is provided an electronic device operable to assist in a determination of a position and/or a time, the electronic device comprising:

a transmitter, configured to:

transmit a first wireless signal at a first frequency; and transmit a second wireless signal at a second frequency, different from the first frequency, a receiver, configured to:

receive a first return signal from a first wireless communications device; and receive a second return signal from a second wireless communications device, the electronic device further comprising at least one processor, configured to:

generate first phase information, comprising at least one of:

a phase of the transmitted first wireless signal and a phase of the received first return signal; and a phase-difference between these two phases;

generate second phase information, comprising at least one of:

a phase of the transmitted second wireless signal and a phase of the received second return signal; and a phase-difference between these two phases; and provide at least one of:
the first phase information and the second phase information; and
a phase-comparison between the first phase information and the second phase information,
for assisting in a determination of a position and/or a time.

The first return signal is preferably transmitted at the first frequency. The second return signal is preferably transmitted at the second frequency.

According to a seventh aspect of the invention, there is provided a method of producing calibration information, the method comprising:

obtaining first phase information, the first phase information characterizing a first phase of a first wireless signal transmitted by a transmitter at a first frequency and received by a first receiver at a first location; and obtaining second phase information, the second phase information characterizing a second phase of a second wireless signal transmitted by the transmitter at a second frequency and received by a second receiver at a second location, wherein the second frequency is different from the first frequency and the second location is different from the first location, the method further comprising:

comparing the first phase information with the second phase information to produce phase comparison information, wherein a component of the phase comparison information that is dependent on the distance ($d_{AP}$) between the transmitter and the first receiver and the distance ($d_{BP}$) between the transmitter and the second receiver is known;

wherein the calibration information comprises the phase comparison information.

In some embodiments, the distance-dependent component of the phase comparison information may be known by knowing the value of $$\frac{\Delta \varphi_{AB,P}}{2\pi} = \frac{d_{AP}}{\lambda_1} - \frac{d_{BP}}{\lambda_2}$$

wherein $d_{AP}$ is the distance between the transmitter and the first receiver, $d_{BP}$ is the distance between the transmitter and the second receiver, $\lambda_1$ is the wavelength of the first wireless signal, and $\lambda_2$ is the wavelength of the second wireless signal, In some embodiments, the distance-dependent component of the phase comparison information may be known by the locations of the transmitter, the first receiver and the second receiver being known (or the locations of the first receiver and second receiver being known, relative to the transmitter).

The calibration information may further comprise at least one calibration reference time associated with the phase comparison information.

Optionally, the first phase information comprises a phase-comparison at the first receiver between the first phase and a third phase of a third wireless signal transmitted by a further transmitter at the first frequency and received at the first receiver; and the second phase information comprises a phase-comparison at the second receiver between the second phase and a fourth phase of a fourth wireless signal transmitted by the further transmitter at the second frequency and received at the second receiver.

In some such embodiments, the distance-dependent component of the phase comparison information may be known by knowing the value of $$\frac{\Delta \varphi_{AB,PQ}}{2\pi} = \frac{d_{AP} - d_{AQ}}{\lambda_1} - \frac{d_{BP} - d_{BQ}}{\lambda_2}$$

wherein $d_{AQ}$ is the distance between the transmitter and the first receiver and $d_{BQ}$ is the distance between the transmitter and the second receiver.

This method can produce calibration information for use when the phase information is derived from a transmitter and further transmitter combined, as summarised already above.

Note that, by this method, the relative phases of the transmitter and further transmitter can be calibrated without necessarily calibrating the phase difference between two signals transmitted by each transmitter on its own. That is, it is not necessary to explicitly determine the phase difference between the first and second wireless signals or between the third and fourth wireless signals.

According to an eighth aspect of the invention, related to the fifth aspect, there is provided a server computer for providing a supporting service for positioning or timing measurements, the server computer comprising:

a memory; and
a processor, configured to:
generate an instruction for at least one electronic device, to cause the electronic device to transmit first and second wireless signals at respective first and second different frequencies; and
send the instruction to the electronic device.

The instruction preferably comprises a request to transmit the first wireless signal; a request to transmit the second wireless signal; a predefined time; and a predetermined phase difference that the signals should have at the predefined time.

The first and second wireless signals may be transmitted for the purpose of assisting a determination of a position and/or a time, according to the first aspect of the invention. Alternatively or in addition, they may be transmitted for the purpose of generating calibration information, according to the second, third, or seventh aspects.

Alternatively or in addition, the instruction may comprise a request for the electronic device to report back the phase difference between the signals at an associated reference time.

The processor may be further configured to: generate instructions for first and second other electronic devices to cause them to receive the first and second wireless signals, respectively; and send these instructions to the respective first and second other devices.

According to the first aspect of the invention, there is also provided an electronic device for positioning and/or timing calculations, comprising:

a memory; and
a processor, configured to:
obtain first phase information, the first phase information characterizing a first phase of a first wireless signal transmitted by a transmitter at a first frequency and received by a first receiver at a first location;
obtain second phase information, the second phase information characterizing a second phase of a second wireless signal transmitted by the transmitter at a second frequency and received by a second receiver at a second location, wherein the second frequency is different from the first frequency and the second location is different from the first location;

compare the first phase information with the second phase information to produce phase comparison information; and use the phase comparison information to assist in the determination of a position and/or a time.

In some embodiments, the electronic device may be a server computer for centralised calculations. In other embodiments, the electronic device may be the transmitter that transmits the first wireless signal and second wireless signal. In still other embodiments, the electronic device may be one or both of the first receiver and the second receiver, which receive the first wireless signal and the second wireless signal, respectively.

BRIEF DESCRIPTION OF THE DRAWINGS

The invention will now be described by way of example with reference to the accompanying drawings, in which.

DETAILED DESCRIPTION

We begin with a short review of the principles set out in PCT/EP2017/058892, which is incorporated herein by reference in its entirety.

Figure 1:
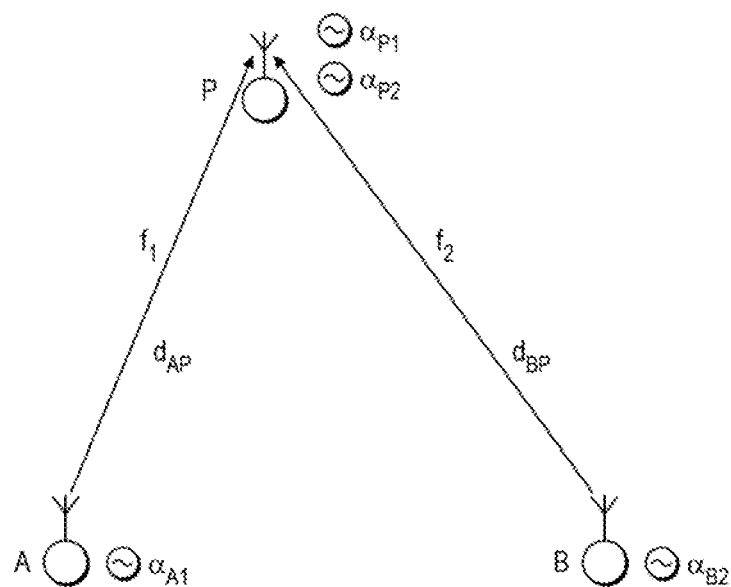
FIG. 1 shows a receiver receiving two radio signals from respective transmitters transmitting at different frequencies.

FIG. 1 shows the situation considered previously, in PCT/EP2017/058892, with two transmitter sources, A and B, and a multi-frequency receiver, P. In the basic concept, we have two wireless devices, A and B, each operating on a different frequency. They might typically be cellular base stations. Signals are exchanged with a third device P, such as a cellular modem, which operates on both frequencies. The difference in the phase shift due to the propagation of the signals at the different frequencies over the different respective path distances is measured. This is then used to assist in the estimation of the position and/or timing of one or more of the devices.

Using the Phase of the "Difference Frequency"

With two sources A and B emitting signals at different frequencies $f_1$ and $f_2$, at distances $d_{AP}$ and $d_{BP}$ from the target receiver P, the phase of each signal after reception with oscillator offset $\alpha_{P1}$ and $\alpha_{P2}$ at frequencies $f_1$ and $f_2$ is:

$$\theta_{AP}(t)=\alpha_{A1}-\alpha_{P1}+2\pi f_1(t-d_{AP}/C)$$

$$\theta_{BP}(t)=\alpha_{B2}-\alpha_{P2}+2\pi f_2(t-d_{BP}/c)$$

The phase difference observed at the target device P is:

$$\Delta\theta_{AB,P}(t) = (\alpha_{A1} - \alpha_{B2}) - (\alpha_{P1} - \alpha_{P2}) + 2\pi f_1\left(t - \frac{d_{AP}}{c}\right) - 2\pi f_2\left(t - \frac{d_{BP}}{c}\right)$$

$$\Delta\theta_{AB,P}(t) = (\alpha_{A1} - \alpha_{B2}) - (\alpha_{P1} - \alpha_{P2}) + 2\pi\Delta f_{12}t - 2\pi\left(\frac{f_1 d_{AP} - f_2 d_{BP}}{c}\right)$$

$$\Delta\theta_{AB,P}(t) = \Delta\alpha_{AB} - \Delta\alpha_P + 2\pi\Delta f_{12}t - \Delta\varphi_{AB,P}$$

Where the $\Delta$ symbol is purely a descriptive precursor denoting an observed difference term, and where $$\Delta\alpha_{AB}=\alpha_{A1}-\alpha_{B2}$$

$$\Delta\alpha_P=\alpha_{P1}-\alpha_{P2}$$

are the phase offset between the two sources and between the two frequencies of the receiver at the arbitrary reference time t=0

$$2\pi\Delta f_{12}t=2\pi(f_1-f_2)t$$

is the continuing phase rotation at the difference frequency due to the observed frequency offset between the two sources, and $$\Delta\varphi_{AB,P} = 2\pi\left(\frac{f_1 d_{AP} - f_2 d_{BP}}{c}\right)$$

is a phase offset observed due to the position of the receiver compared to the two sources, and the consequent phase shift due to the distances $d_{AP}$ and $d_{BP}$. The phase of this difference signal provides a measure which we can use for the estimation of the position—specifically, the observed difference in phase shift $\Delta\varphi_{AB,P}$ is related to the distances from the sources $d_i$, $d_j$ by the relationship $$\frac{\Delta\varphi_{AB,P}}{2\pi} = \left(\frac{f_1 d_{AP} - f_2 d_{BP}}{c}\right)$$

or equivalently summarized expressed in terms of the wavelengths of the signals from the two sources, using $\lambda=c/f$, $$\frac{\Delta\varphi_{AB,P}}{2\pi} = \frac{d_{AP}}{\lambda_1} - \frac{d_{BP}}{\lambda_2}$$

This measured phase of the difference between the signals received from the two sources then provides the basis for a position estimate. It is important to note that this is not the same expression as is used for normal trilateration ranging, in which each phase measurement is normalised with its wavelength, to give a measurement as a function ($d_{AP}$–$d_{BP}$). We will not discuss this further here; details can be found in PCT/EP2016/058032, the disclosure of which is incorporated herein by reference in its entirety.

The initial phase offsets in the receiver and the transmitters also need to be handled in some way. This may conveniently be done by a calibration measurement by a receiver in a known location, as discussed in PCT/EP2017/058892.

Decomposition into Difference and Sum Components

It is very helpful to express the phase difference in terms of the sum and difference of the distances to the sources, as follows. The equation $$\frac{\Delta\varphi_{AB,P}}{2\pi} = \left(\frac{f_1 d_{AP} - f_2 d_{BP}}{c}\right)$$

can also be expressed as $$\frac{\Delta\varphi_{AB,P}}{2\pi} = \frac{f_1 + f_2}{2c}(d_{AP} - d_{BP}) + \frac{f_1 - f_2}{2c}(d_{AP} + d_{BP})$$

The variation of the phase difference $\Delta\varphi_{AB,P}$ according to location is therefore made up of two components:
- a hyperbolic relationship according to the difference in distance ($d_{AP}$–$d_{BP}$), corresponding to the average frequency
- an elliptic relationship according to the sum of the distances ($d_{AP}$+$d_{BP}$), corresponding to the half difference frequency These two effects are combined in overall variation in the phase shift with location, and correspondingly in time.

Figure 2:
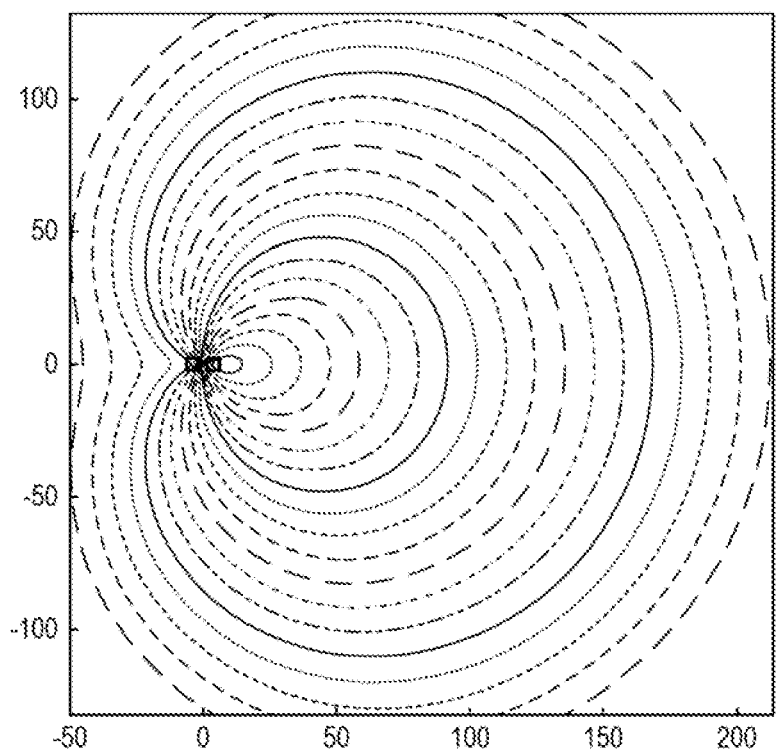
FIG. 2 shows a locus of points of equal phase difference, for two transmitters like those in FIG. 1.

An example of the variation of the difference phase with location at a particular measurement time is shown in FIG. 2. This shows the set of points with the same phase difference, at a particular moment in time, between the two signals received at that point from the two sources, shown marked as squares. There are a set of curves, as the phase difference has an ambiguity of $2\pi$. The exact shape of the curves depends on the spacing between the sources, here 8 wavelengths, and the ratio of the frequency offset between the sources, here 1.1 (the ratio between the difference between the frequencies, and the sum of the frequencies). The greater each of these parameters, the greater the effects as illustrated here.

In a positioning application, the ambiguity among the set of curves will be resolved by gathering additional information or measurements. Thus, the measurements and calculations made as described herein will typically be combined with others. For example, they may be combined with time of arrival measurements of signals of opportunity, phase measurements of the same or different kinds for other transmitters, or measurements of satellite positioning signals—for example, a set of measurements of GNSS signals that is either incomplete or not sufficiently reliable to calculate an accurate position fix.

Because the ambiguity (in this case, the ambiguity in distance) depends on the difference in frequency between the two signals, the use of phase comparison between the signals may be more advantageous for positioning (and timing) applications than attempting to use the carrier phase directly. The distance corresponding to the ambiguity interval at the carrier frequency would be very small, whereas the distance corresponding to the ambiguity interval at the "difference frequency" is larger and therefore likely to be easier to resolve.

Key Features

The features and steps used to exploit the measurement of the phase difference for positioning in such configurations may be summarised as follows:
- The phase difference varies with time, with a frequency corresponding to the difference frequency $f_1$–$f_2$. The times of the phase measurements are noted and used as part of the measurement information.
- The locus of positions illustrated in FIG. 2 varies with time, propagates through space, and the trilateration for positioning is a solution for the time of the target, as well as for its position. (It is not a fixed hyperbolic difference relationship, as is the case when the difference distance is formed, which contains no information about the time at the target)
- The phase difference is ambiguous, with an integer ambiguity in the phase difference. (It is not a combination of fractional ambiguities, which arises when the phase measurements are scaled with the respective wavelengths before forming the distance difference.)

Extension to a Transmitting Multi-Frequency Device

It has now been recognised that the direction in which the two signals are propagated can be reversed. That is, the signals can be transmitted from a "multi-frequency" transmitter to two receivers, each of which need only receive on a "single" frequency. It has further been recognised that it is possible to determine and compare the phases of signals at different frequencies, which are received independently at two separate receivers. In the case described in PCT/EP2017/058892, it was more straightforward to compare the phases of interest, because they related to signals received at the same receiver device. In general, it is not always so straightforward to compare the phases of signals arriving at two separate receivers into different places.

Figure 3:
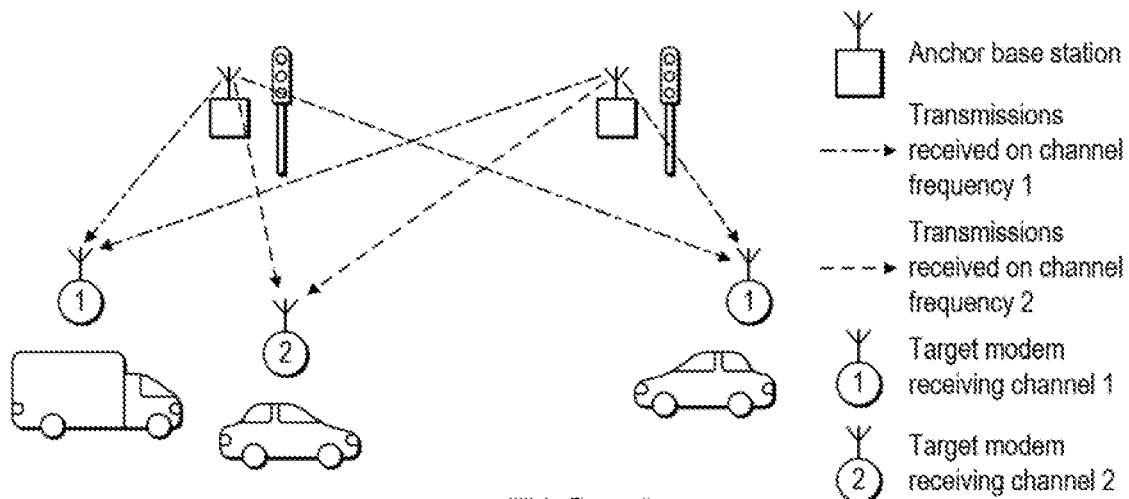
FIG. 3 shows an application configuration according to an embodiment of the invention, with multi-frequency base station anchors and target modems operating on two different channel frequencies.

To illustrate a practical example, consider the case when base station installations are operating on multiple frequencies, and are serving different devices on each frequency. This can be the case
- for single network operators who are providing services on multiple channels and hence multiple frequencies; or
- for a base station installation which is supporting more than one network operator, and hence more than one channels In such a system the modems themselves may be operating on a single frequency, each just communicating with base stations on their respectively allocated channel and frequency. An example is shown in FIG. 3. This shows a vehicle positioning application in which roadside anchors (base stations) are each transmitting on multiple channels on different frequencies, and each of the vehicles is equipped with a receiver that receives signals on just one channel. The channel and frequency differs from vehicle to vehicle—for example depending on which network the vehicle is using for communication.

It is desired that the vehicles perform positioning (to estimate position, velocity and time) using the measurements by the vehicles of the signals received from the base stations. All measurements can be used: time of arrival, signal strength, phase and angle of arrival, and doppler shift. The measurement which leads to best precision is the phase of the signal, as long as the ambiguity inherent in the measurement can be handled. Normally, when using phase, we have sets of signals and measurement on the same frequency, so that measurements can be directly compared and used, with standard hyperbolic difference relationships. In the present case, we have signals on different frequency signals on different paths but, despite the problems introduced by the different frequencies used, we still propose the use of phase measurements in this situation, as described in greater detail below.

Figure 4:
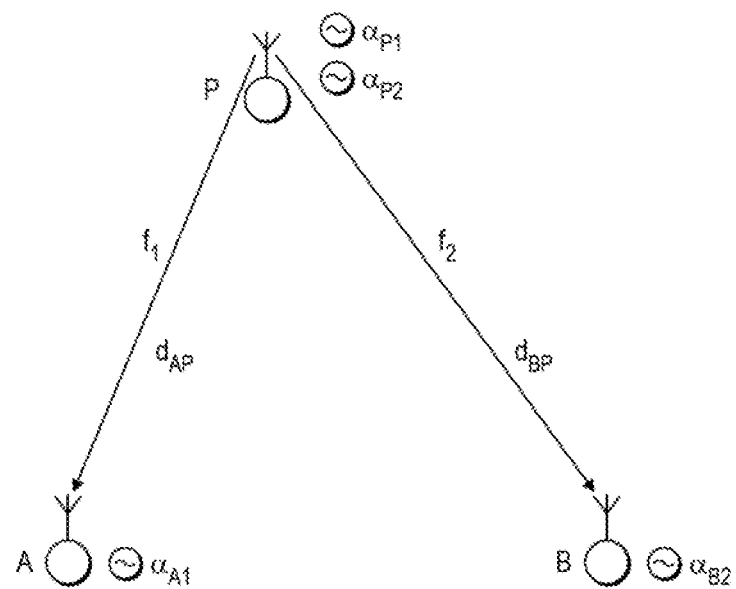
FIG. 4 illustrates a device transmitting on two frequencies, received by different devices on different frequencies, according to an embodiment of the invention.

To explain the approach, we can consider the multi-frequency device transmitting on the two frequencies, as shown in FIG. 4. A device P transmits on two different frequencies, and two devices A and B in different locations receive the different frequency signals, measure the phase, and the difference in the measurements is used for positioning. In general, any of A, B, and/or P may be in known or unknown locations—this depends on the application and the positioning—(or timing—) problem to be tackled. The phase difference measurement result is combined with other information and measurements in the positioning engine to find the unknown positions and/or times. The positioning engine may be software in any of the devices, or in a central service, using measurement results provided by the devices.

The two signals transmitted by P are received respectively by two different receivers, A and B, which together measure the phase difference in the signals received by the two receivers. The distinction is subtle but important—in this configuration, the multi-frequency device P is transmitting on two frequencies $f_1$ and $f_2$, whereas in PCT/EP2017/058892 and FIG. 1 the multi-frequency device P is receiving on two frequencies. Nevertheless, the set of measurements are comparable and the equations and relationships are closely similar. We have the equations for the signal transmitted at P and received at A and at B:

$$\theta_{PA}(t) = \alpha_{P1} - \alpha_{A1} + 2\pi f_1(t - d_{AP}/c)$$

$$\theta_{PB}(t) = \alpha_{P2} - \alpha_{B2} + 2\pi f_2(t - d_{BP}/c)$$

The difference between the phase of the signal observed at A, and the phase of the signal observed at B, is then $$\Delta\theta_{AB,P}(t) = (\alpha_{P1} - \alpha_{P2}) - (\alpha_{A1} - \alpha_{B2}) - 2\pi f_1\left(t - \frac{d_{AP}}{c}\right) - 2\pi f_2\left(t - \frac{d_{BP}}{c}\right)$$

giving $$\Delta\theta_{AB,P}(t) = \Delta\alpha_P - \Delta\alpha_{AB} + 2\pi\Delta_{12}t - \Delta\varphi_{AB,P}$$

with the same definitions as provided already above. The only difference in the equation compared with the case in which the multi-frequency device is receiving, is that the signs of the initial offsets are changed, as the devices have changed roles between transmitting and receiving. As before, the phase of this "difference signal" provides a measure that we can use for the estimation of the position (or time)—specifically, the observed difference in phase shift $\Delta\varphi_{AB,P}$ is related to the distances $d_i$, $d_j$ from the source by the relationship $$\frac{\Delta\varphi_{AB,P}}{2\pi} = \left(\frac{f_1 d_{AP} - f_2 d_{BP}}{c}\right)$$

and we again have the variation of the difference in the phase measurements (this time between measurements made at A and at B, for signals transmitted by P), with the expressions using $\lambda = c/f$ $$\frac{\Delta\varphi_{AB,P}}{2\pi} = \frac{d_{AP}}{\lambda_1} - \frac{d_{BP}}{\lambda_2}$$

the decomposition $$\frac{\Delta\varphi_{AB,P}}{2\pi} = \frac{f_1 + f_2}{2c}(d_{AP} - d_{BP}) + \frac{f_1 - f_2}{2c}(d_{AP} + d_{BP})$$

and the same form of the variation with location shown already in FIG. 2. The phase measurement, difference, and equation can be combined with other similar or different measurements and equations from these and other receivers, to estimate the position or time of one or more target devices.

One of the challenges when attempting to compare the phases of signals arriving at different receivers is to provide a common reference for comparing them. Three particular preferred ways of tackling this challenge will now be described. Note that other suitable methods may also be used. Also note that, although each approach is described in isolation—applying the same referencing approach to all of the phase measurements—the methods may be combined in some embodiments.

Method 1: Round Trip Phase Measurement on Different Frequencies

Figure 5:
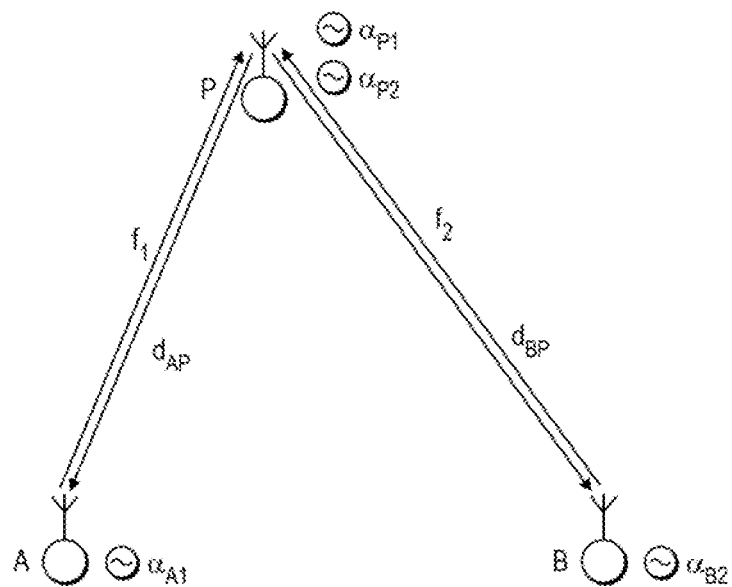
FIG. 5 shows a device transmitting on two frequencies, with a round trip measurement of the phase to the different far-end devices.

In some system configurations, a signal may be transmitted by the single frequency device back to the multi-frequency device, as shown in FIG. 5.

In this configuration:
the transmitted phase of the first return signal (for example, signal $\overrightarrow{AP}$) has a known relationship to the received phase of the first signal (signal $\overrightarrow{PA}$)
the return signal is received back at the source (P), and its phase measured and compared to the transmission phase of the first signal
in this configuration there is no time variation in the round trip phase measurement, when the signal $\overrightarrow{PA}$ is at the same frequency as the signal $\overrightarrow{AP}$.
this gives the phase due to the round trip propagation along the path (for example, AP) in both directions, at frequency ($f_1$)—so, effectively the propagation distance $2d_{AP}$.
two such measurements are carried out at different frequencies to the different devices, A and B the round trip phase difference in the phase measurements is taken, and used for positioning $$\frac{\Delta \varphi_{AB,P}^{trip}}{2\pi} = \frac{2d_{AP}}{\lambda_1} - \frac{2d_{BP}}{\lambda_2}$$

the difference has the same elliptic hyperbolic form, and the integer $2\pi$ ambiguity The "difference phase" measurement at the two frequencies can therefore be used for positioning, as described in the preceding section (with an additional factor of 2 for the distance, as the path length is measured twice—once in each direction).

Note that, in general:
the order in which the measurements are made is immaterial
the round trip can be initiated either by the multi-frequency device (P transmitting e.g. $\overrightarrow{PA}$) or by the single frequency device (e.g. A transmitting $\overrightarrow{AP}$)
the round trip measurement may be performed in either
the multi-frequency device (forming e.g. $\overrightarrow{PA}+\overrightarrow{AP}$) or
the single frequency device (forming e.g. $\overrightarrow{AP}+\overrightarrow{PA}$)

This "round trip" approach can be generalised even further: although in the example above the return signal is transmitted in response to receipt of the wireless signal from the transmitter P, this is not essential. All that is required is that one signal is transmitted from P to A, and another signal is transmitted from A to P. At each end, the device notes the phase-difference between transmission and arrival (or between arrival and the transmission), and these phase differences are used to determine the equivalent round trip phase change.

Note that, when there is no direct causal relationship between the signals (that is, one signal is not transmitted in response to the other), the phase difference information at the far end has to be combined with the phase difference at the near end in order to measure the round trip phase change over twice the path length. All phase measurements and differences formed are subject to the $2\pi$ phase ambiguity.

Note also that, because the dependence upon time is eliminated from the equations in this configuration, there is one less variable for which the positioning engine must solve. However, as a result, it is not possible to use measurements gathered in this way to assist in a timing calculation. This method is therefore only suitable for assisting the calculation of a position.

Method 2: Comparison with a Reference Signal

Alternatively or in addition, the receiver (for example, A) may compare the phase of the received signal with a convenient third reference signal $f_3$ from a source R as a step in the positioning process, so that A then makes measurements of the phase with difference frequency $f_1-f_3$ at a known time. Making a phase difference measurement from two sources on different frequencies at different locations is described in PCT/EP2016/058032 and PCT/EP2017/058892. B may also make measurements of the phase with difference frequency $f_2-f_3$ at a known time.

The phase difference measurements compared with the reference, together with the time of measurement, may be communicated to the positioning engine and used for positioning, as described in the previously mentioned PCT applications.

In the positioning algorithm, the difference between the phase at the two receivers (A and B) of the signals from the multi-frequency source (P) may be formed, by subtracting the phase from B at the frequency $f_2-f_3$, from the phase from A at the frequency $f_1-f_3$. This will give, once again, the phase difference at the frequency just of the "multi-frequency source" $f_1-f_2$, as if the phase difference had been carried out directly, as described previously above.

Method 3: Comparison of Two Measurements on Different Frequencies

Figure 6:
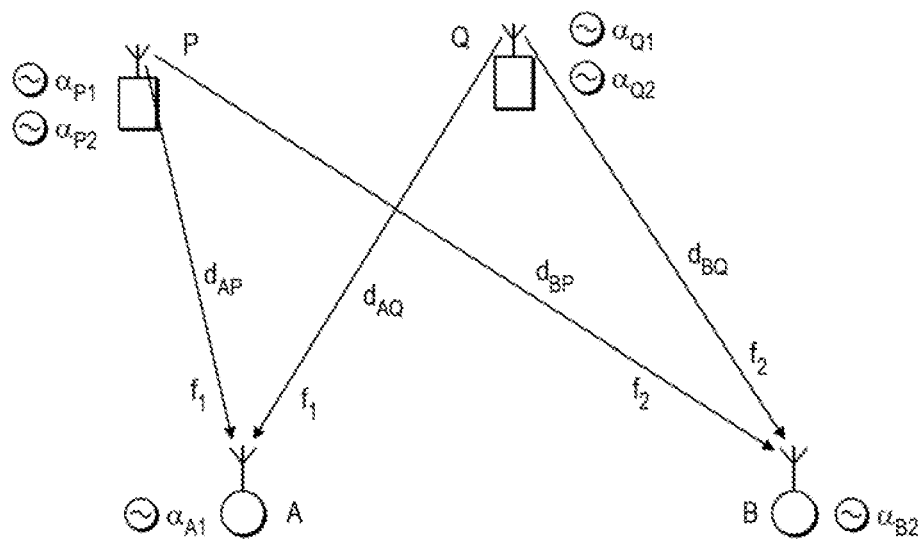
FIG. 6 illustrates an example of positioning by measuring phase at different frequencies.

As a further alternative or additional option, positioning with phase difference measurements can be performed with a set of multi-frequency sources received by a set of different single frequency receivers, as shown in FIG. 6. In this case, each modem measures the phase difference of the signals which it receives on its frequency. Modem A is operating on one frequency, $f_1$, while modem B is operating at a second different frequency, $f_2$. Positioning is then performed by using the difference between the phase combination measurements of the two receivers on the two frequencies.

This can be expressed in equations as follows. For simplicity we will consider the signals being transmitted and received concurrently on the different frequencies and by the different modems. Using the same starting point as before, we have the equation for the signal transmitted at P and received at A $$\theta_{PA}(t) = \alpha_{P1} + 2\pi f_1(t-d_{AP}/c)$$

and we also receive and measure the signal received from the second transmitter Q $$\theta_{QA}(t) = \alpha_{Q1} + 2\pi f_1(t-d_{AQ}/c)$$

so that the signals received at A at frequency $f_1$ gives the "difference phase" measurement $\theta_{A1}(t)$ for the signals received from P and from Q:

$$\theta_{A1}(t) = \theta_{PA}(t) - \theta_{QA}(t) = \alpha_{P1} - \alpha_{Q1} - \frac{2\pi f_1}{c}(d_{AP} - d_{AQ})$$

Because the receiver is forming the difference in phase between the two signals measured at the same frequency, f, there is in this case no longer a variation with time, $\theta_{A1}(t) = \theta_{A1}$ Similarly, at receiver B, receiving signals at $f_2$ gives the difference phase measurement $\theta_{B2}(t)$:

$$\theta_{B2}(t) = \theta_{PB}(t) - \theta_{QB}(t) = \alpha_{P2} - \alpha_{Q2} - \frac{2\pi f_2}{c}(d_{BP} - d_{BQ})$$

Then, subtracting the two phase differences measured at the two different locations at the different frequencies gives the difference $$\theta_{A1} - \theta_{B2} =$$

$$(\alpha_{P1} - \alpha_{P2}) - (\alpha_{Q1} - \alpha_{Q2}) - \frac{2\pi f_1}{c}(d_{AP} - d_{AQ}) + \frac{2\pi f_1}{c}(d_{BP} - d_{BQ})$$

$$\theta_{A1} - \theta_{B2} = \Delta\alpha_{P12} - \Delta\alpha_{Q12} - \frac{2\pi f_1}{c}(d_{AP} - d_{AQ}) + \frac{2\pi f_1}{c}(d_{BP} - d_{BQ})$$

$$\theta_{A1} - \theta_{B2} = \Delta\alpha_{P12} - \Delta\alpha_{Q12} - \frac{2\pi f_1}{c}(d_{AP} - d_{AQ}) + \frac{2\pi f_2}{c}(d_{BP} - d_{BQ})$$

$$\frac{\theta_{A1} - \theta_{B2}}{2\pi} = \frac{\Delta\alpha_{P12} - \Delta\alpha_{Q12}}{2\pi} - \frac{(d_{AP} - d_{AQ})}{\lambda_1} + \frac{(d_{BP} - d_{BQ})}{\lambda_2}$$

-continued $$\frac{\theta_{A1} - \theta_{B2}}{2\pi} = \left[\frac{\Delta\alpha_{P12}}{2\pi} - \frac{d_{AP}}{\lambda_1} + \frac{d_{BP}}{\lambda_2}\right] - \left[\frac{\Delta\alpha_{Q12}}{2\pi} - \frac{d_{AQ}}{\lambda_1} + \frac{d_{BQ}}{\lambda_2}\right]$$

$$\frac{\theta_{A1} - \theta_{B2}}{2\pi} = \left[\frac{\Delta\alpha_{P12}}{2\pi} - \frac{\Delta\varphi_{AB,P}}{2\pi}\right] - \left[\frac{\Delta\alpha_{Q12}}{2\pi} - \frac{\Delta\varphi_{AB,Q}}{2\pi}\right]$$

where $$\Delta\alpha_{P12} = \alpha_{P1} - \alpha_{P2}$$

$$\Delta\alpha_{Q12} = \alpha_{Q1} - \alpha_{Q2}$$

and the definitions for spatial relationships $\Delta\varphi_{AB,P}$ are as previously above:

$$\frac{\Delta\varphi_{AB,P}}{2\pi} = \frac{d_{AP}}{\lambda_1} - \frac{d_{BP}}{\lambda_2}$$

and similarly $$\frac{\Delta\varphi_{AB,Q}}{2\pi} = \frac{d_{AQ}}{\lambda_1} - \frac{d_{BQ}}{\lambda_2}$$

Similarly to the approach taken previously above, this phase relationship can then be expressed as a combination of the following components:
a phase offset $\Delta\alpha_{P12} - \Delta\alpha_{Q12}$ which is the initial bias relationship between the clocks at the two frequencies in the transmitters. This may be known
from design and operational knowledge about the transmitters P and Q; and/or
from calibration with A and B in known locations
a phase variation which depends on the distances
for the difference phases to A and B resulting from the distances from each of P and Q
with $\Delta\varphi_{AB,P} = \Delta\varphi_{AB,P} - \Delta\varphi_{AB,Q}$
with the integer ambiguity of multiples of $2\pi$ in the phase relationship.

In this configuration, because the measurements from different transmitters have been combined prior to the differencing (differencing being commutative) the time variation has been removed. However, there may still be time effects if the measurements of the different transmitters by the receivers are made at different times.

The variation of phase with position is most relevant and is expressed as:

$$\frac{\Delta\varphi_{AB,PQ}}{2\pi} = \frac{\Delta\varphi_{AB,P}}{2\pi} - \frac{\Delta\varphi_{AB,Q}}{2\pi}$$

$$\frac{\Delta\varphi_{AB,PQ}}{2\pi} = \left(\frac{d_{AP} - d_{AQ}}{\lambda_1}\right) - \left(\frac{d_{BP} - d_{BQ}}{\lambda_2}\right)$$

This is the same elliptic hyperbolic variation in position that was described above with reference to FIG. 2. Here, we have combined two measurement differences so that the variation is now of the difference in distances, that is $(d_{AP} - d_{AQ})$ and $(d_{BP} - d_{BQ})$.

As before, we have the integer ambiguity in phase, and hence the solution may lie on any one of the curves of constant phase separated by $2\pi$. The phase measurement provides high precision, with further information or measurements being used to resolve the ambiguity.

Note once again that, because the dependence upon time is eliminated from the equations in this configuration, there is one less variable for which the positioning engine must solve. However, as a result, it is not possible to use measurements gathered in this way to assist in a timing calculation. This method is therefore only suitable for assisting the calculation of a position.

Relative Phases of Transmission

It is necessary for the positioning engine to be able to determine the relative phases with which the signals have been transmitted by the multi-frequency transmitter. This can be achieved in a variety of ways. In one example, the transmitter is controlled so as to transmit the first wireless signal and the second wireless signal with a predetermined phase difference between them at a certain time. (The phase difference will vary with time, according to the difference frequency). In another example, the phase-difference is not predetermined but is reported by the transmitter to the positioning engine, preferably along with a reference time at which the phase difference was valid. In another example, not requiring the cooperation of the transmitter, reference measurements of the two signals are made by a calibration receiver at a known distance from the transmitter. The reference measurements are reported to the positioning engine by the calibration receiver. In a variant of this example, rather than providing a calibration receiver remote from the transmitter, a calibration circuit is provided at the transmitter, with a wired connection to the transmitter. The calibration circuit is thus able to obtain the signals directly from the transmitter and measure their phase at the point of transmission.

Embodiments

Particularly useful embodiments of the present invention relate to wireless infrastructure networks. As used herein, a "wireless infrastructure network" is defined as a wireless network that is organised in a hierarchical manner, comprising one or more instances of User Equipment (UE), wherein each UE communicates with and is served by a Base Station (BS). The communications between each UE and its serving BS are controlled by the BS. Typically, access to the wireless medium is strictly controlled by the BS, which is responsible for coordinating and orchestrating the PHY and MAC layers. Direct, spontaneous, radio communication between UEs is typically not allowed. Types of wireless infrastructure networks include but are not limited to cellular networks.

Embodiments of various aspects in the context of wireless infrastructure networks will now be described with reference to FIGS. 7-9. Nevertheless, as those skilled in the art will appreciate, the scope of the present invention is not limited to use in wireless infrastructure networks.

Figure 7:
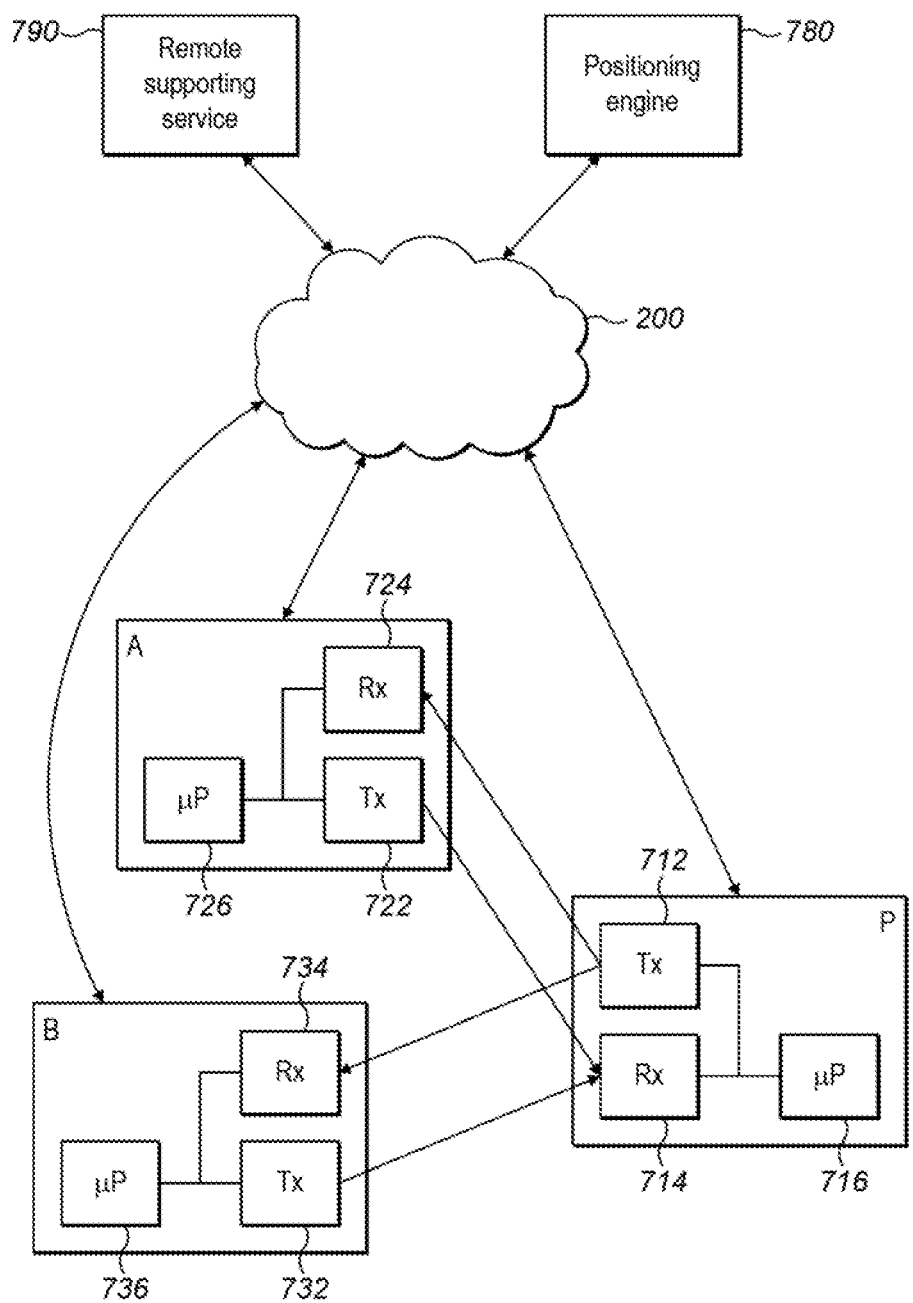
FIG. 7 is a schematic block diagram of a network of electronic devices operating according to a first embodiment of the invention.
Figure 8:
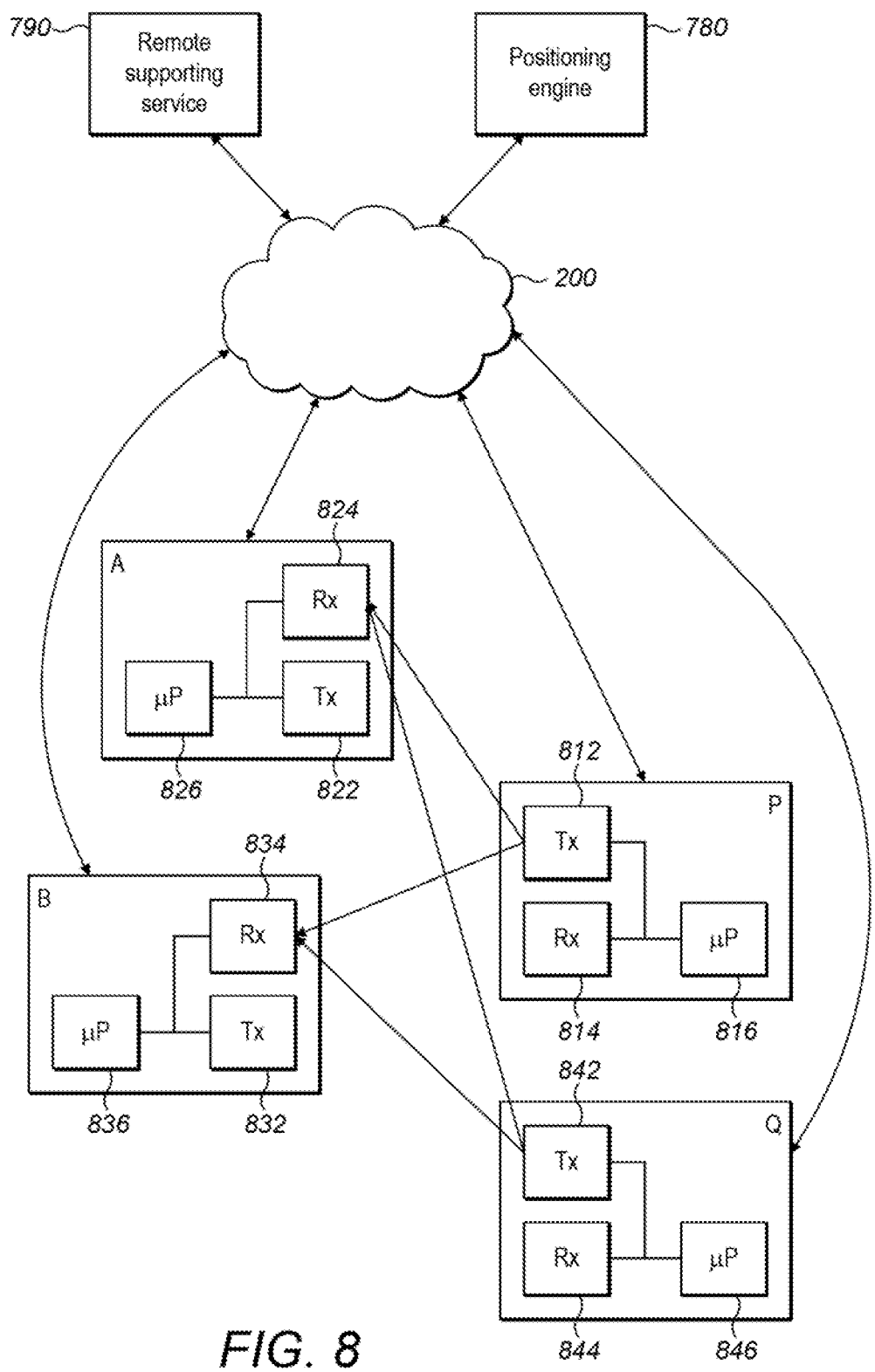
FIG. 8 is a schematic block diagram of a network of electronic devices operating according to a second embodiment of the invention.
Figure 9:
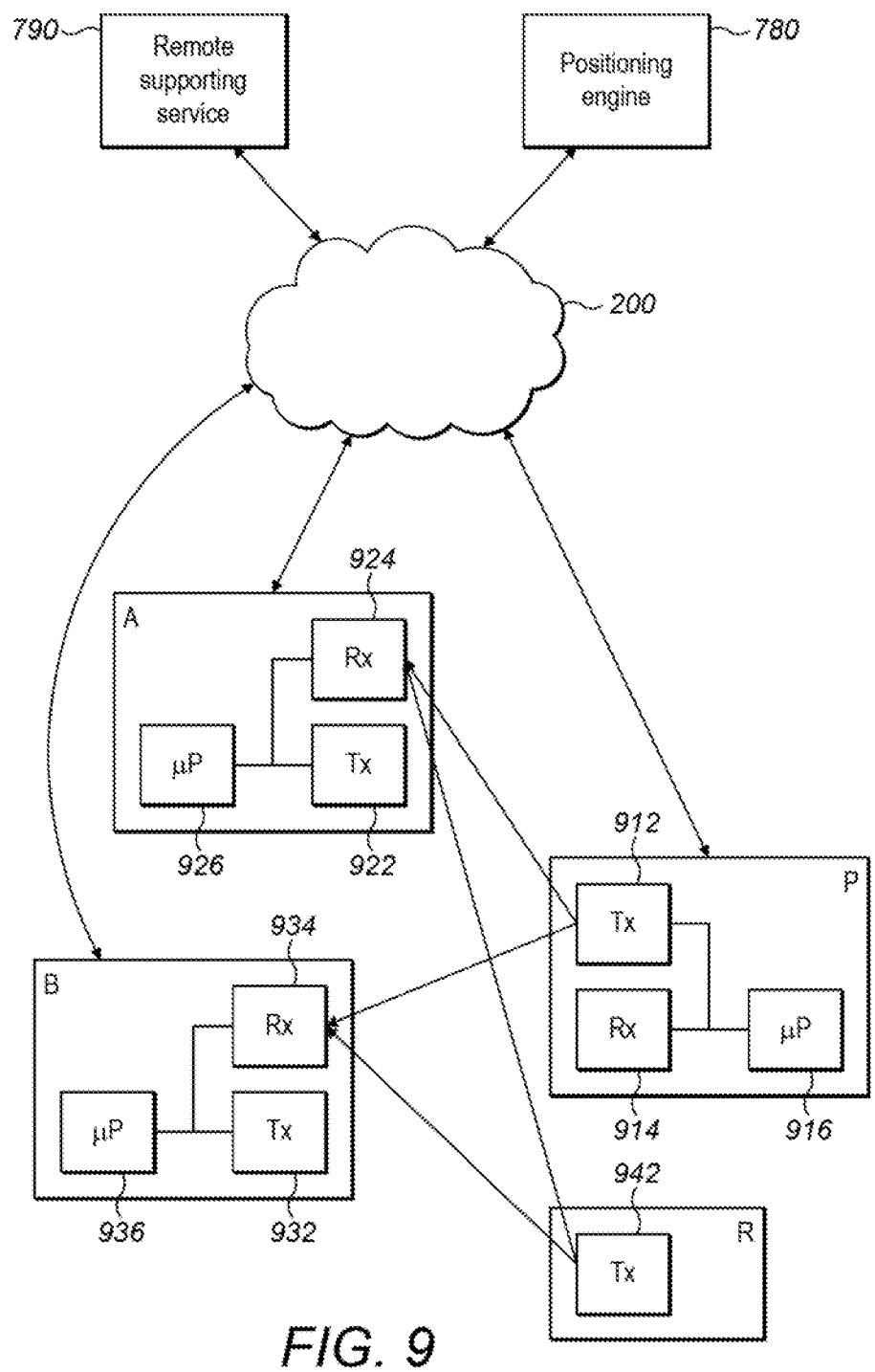
FIG. 9 is a schematic block diagram of a network of electronic devices operating according to a third embodiment of the invention.

Each of FIGS. 7-9 shows a schematic block diagram of a wireless infrastructure network comprising electronic devices operating according to an embodiment of the invention. The network may comprise wireless communications devices A, B, P, and Q. The devices A and B may be UEs; the devices P and Q may be BSs.

The wider system illustrated in FIGS. 7-9 also includes a positioning engine 780, which is a remote server computer configured to calculate a position and/or time. It further includes a remote supporting service 790, which is a remote server computer configured to provide a supporting service for the other devices in the system. Note that, although shown separately, the positioning engine 180 and the remote supporting service 190 may be provided by the same server computer.

In the example shown in FIGS. 7-9, the positioning engine 780 and remote supporting service 790 are coupled to a network 200. In different embodiments, this may be a public or private, wired or wireless network, or a combination of different networks of different types. For example, the network 200 may comprise parts of the infrastructure of one or more cellular networks and/or may comprise part of the Internet.

The devices A, B, P, and Q are also coupled to network 200. In one example, the UE devices A and B may be communicatively coupled to the network 200, the remote supporting service 190, and the positioning engine 180, via a BS device P or Q. In this example, the UE devices A and B communicate with the remote supporting service 190 and positioning engine 180 using user plane data transmitted via a cellular data connection with a BS device, P or Q, and via the network 200.

Figure 10:
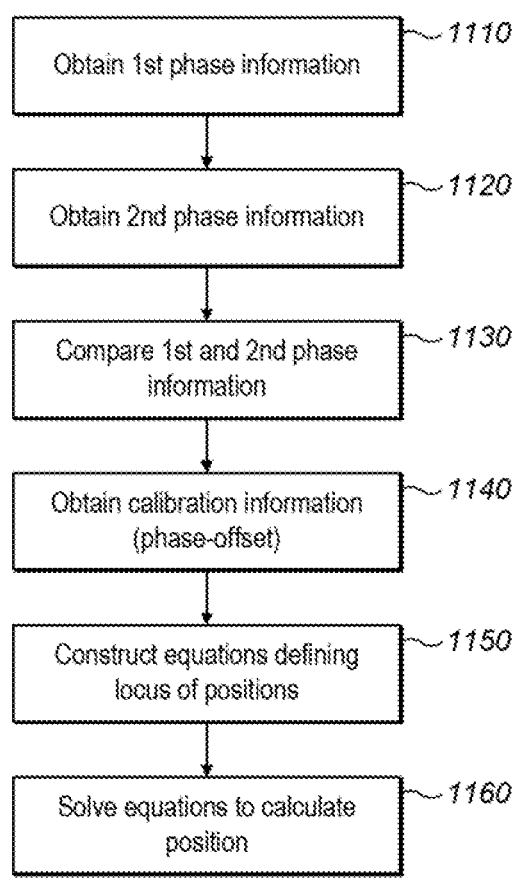
FIG. 10 is a flowchart of a method according to an embodiment of the first aspect of the invention.

The basic underlying method in each embodiment is the same and is illustrated in FIG. 10. This method will now be described on the assumption (for simplicity) that the method is implemented by the positioning engine 780. Note that this is not essential. The implementation of the method can be carried out at one of the other devices in the network (such as wireless communication devices A, B, or P) or distributed between such devices.

In step 1110, the positioning engine 780 obtains first phase information. The first phase information characterises a first phase of a first wireless signal transmitted by a transmitter 712 and received by a first receiver 724. In step 1120, the positioning engine 780 obtains second phase information. This characterises a second phase of a second wireless signal transmitted by the same transmitter 712 and received by a second receiver 734. The first and second wireless signals are transmitted at different frequencies, and the first and second receivers 724 and 734 are located at different locations. In step 1130, the positioning engine 780 compares the first and second phase information to produce phase comparison information. It then uses this phase comparison information in the determination of a position. This is done by constructing a set of equations defining a locus of positions (step 1150) and solving the equations to calculate the position (step 1160). The equations may be of the form described previously above, relating the phase comparison information to the distances between the transmitter 712 and the respective receivers 724 and 734. The phase comparison is preferably a phase difference. This difference may be formed in a variety of ways, as will be described in greater detail below.

In general, it may be non-trivial to form a meaningful phase comparison between phases measured at different receivers. Several strategies are proposed to overcome this difficulty. These are exemplary, and by no means exhaustive.

The embodiment of FIG. 7 uses the "round trip" approach ("Method 1" described above). In this approach, the first receiver 724 is part of a first wireless communications device A and the second receiver 734 is part of a second wireless communications device B. Each of these devices further comprises a respective transmitter 722 and 732. The transmitter 722 is configured to transmit a first return signal to a receiver 714 at the transmitter 712 (that is, co-located with the transmitter 712). Similarly, the transmitter 732 is configured to transmit a second return signal to the receiver 714. The first return signal is transmitted at the first frequency and the second return signal is transmitted at the second frequency.

In the simplest case, each return signal is transmitted in response to the arrival of the respective wireless signal from the transmitter 712. The phase delay between the reception and transmission, at the wireless communications devices A and B, is known either because it is fixed and predefined in advance or because it is reported by the device A or B to the positioning engine 780. The device P can then simply measure the phase difference between its transmission of the wireless signal and its reception of the corresponding return signal. This phase difference will comprise a phase shift in the carrier corresponding to twice the path length, plus the (known) phase shift as a result of the time delay taken for the device A or B at the far end to respond. This phase difference for each device, A and B, forms the first and second phase information, respectively. By characterising the phase of the return signal, the phase information also characterises a phase of the "outbound" wireless signal.

Note however that this approach can be generalised. It is not essential for the return signal to be transmitted in response to the wireless signal (or vice versa). For example, the transmitter 722 may periodically transmit a first return signal to the receiver 714, independently of the reception of the first wireless signal. At the first wireless communications device A, the processor 726 calculates the phase difference between the arriving first wireless signal at the receiver 724 and the first return signal transmitted by the transmitter 722. At the electronic device P, the processor 716 calculates the phase-difference between the arriving first return signal, received by the receiver 714 from the transmitter 722, and the first wireless signal transmitted by the transmitter 712. Both phase differences are reported to the positioning engine 780. The same procedure is followed for the second wireless communications device B. The positioning engine 780 can then collate this first and second phase information, compare it, and use the result of the comparison to assist the determination of the position.

An electronic device P configured to operate in this way is provided according to an embodiment of the sixth aspect of the invention.

As will be apparent from the foregoing description, the relationship between the first wireless signal and the first return signal (respectively the second wireless signal and the second return signal) is completely symmetrical. It does not matter which signal is transmitted first and therefore it does not matter which device initiates the round-trip measurement.

The embodiment of FIG. 8 uses comparison of two measurements on different frequencies ("Method 3" described above). To avoid repetition, similar components are given similar reference numerals. Except where the contrary is indicated, it may be assumed that these components have similar functions to their counterparts in the first embodiment, illustrated in FIG. 7.

In this second embodiment, the first phase information comprises a phase-comparison at the first receiver 824 between the first phase of the first wireless signal received from the transmitter 812 and a third phase of a third wireless signal received by the first receiver 824 from a further transmitter 842. Similarly, the second phase information comprises a phase-comparison at the second receiver 834 between the second phase of the second wireless signal received from the transmitter 812 and a fourth phase of a fourth wireless signal received by the second receiver 834 from the further transmitter 842. The further transmitter 842 is comprised in a further electronic device Q.

The first and second phase information is reported to the positioning engine 780 as before. The positioning engine uses it to assist in the calculation of the position. Thus, each receiver can make measurements on its own frequency, and report a phase difference which only depends on the difference between the times of the signals from P and Q, and does not depend on the absolute measurement time. These simple single-frequency difference phases are then combined in the positioning engine to form the phase difference between the various paths travelled at the different corresponding frequencies. These phase differences are then used by the positioning engine to solve for position and/or time.

In some embodiments, the processor 816 of the electronic device P and/or the processor 846 of the electronic device Q may be configured to produce calibration information and report it to the remote supporting service 790 (or to the positioning engine 780). The calibration information comprises a phase-offset determined by the processor between the transmitted first wireless signal and the transmitted second wireless signal, as well as a calibration reference time at which the phase-offset is valid.

The embodiment of FIG. 9 uses comparison with a reference signal ("Method 2" described above). In this third embodiment, the first phase information comprises a phase-comparison at the first receiver 924 between the first phase of the first wireless signal received from the transmitter 912 and a first reference phase of a reference signal received at the first receiver 924 from a reference transmitter 942. The second phase information comprises a phase-comparison at the second receiver 934 between the second phase of the second wireless signal received from the transmitter 912 and a second reference phase of the reference signal as received at the second receiver 934.

As before, the first and second phase information is reported to the positioning engine 780, which compares it, forms the necessary equations, and solves them. Note that, in the first and second embodiments, the dependence upon time disappeared from the equations because of the formulation of the comparison (see Methods 1 and 3 above). In contrast, in the third embodiment, the dependence on time is not eliminated. Therefore, each of the first and second phase information should include a respective measurement reference time at which the phase information is valid. This can be generated using a local clock of the respective wireless communications devices A and B. (The local clock is not shown in the block diagram.)

In some other embodiments, the need for suitable phase referencing is addressed by the positioning engine 780 obtaining calibration information (step 1140), wherein the calibration information comprises a phase-offset at the transmitter between the first wireless signal and the second wireless signal at an associated calibration reference time. This phase-offset may describe the relative phases of the two signals at the point of transmission. According to different aspects and embodiments of the invention, this kind of calibration information can be obtained in a variety of different ways. The calibration information could be measured at the transmitter, or measured remotely from the transmitter. Alternatively or in addition, the transmitter could be commanded to transmit the first and second wireless signals according to preset calibration information (in other words, according to a predetermined phase-offset). As a another alternative or addition, reference measurements may be carried out by two receivers A, B in known relative locations and used to provide transmitter calibration information. Meanwhile, when using multiple transmitters, P and Q, the combination may be calibrated by:

a) calibrating P, and calibrating Q separately using the phase measurements and distances for each; or b) calibrating the (P-Q) difference using the difference phase measurements and difference distances with the receivers A and B in known locations.

Examples of different calibration approaches will now be described in greater detail.

Figure 11:
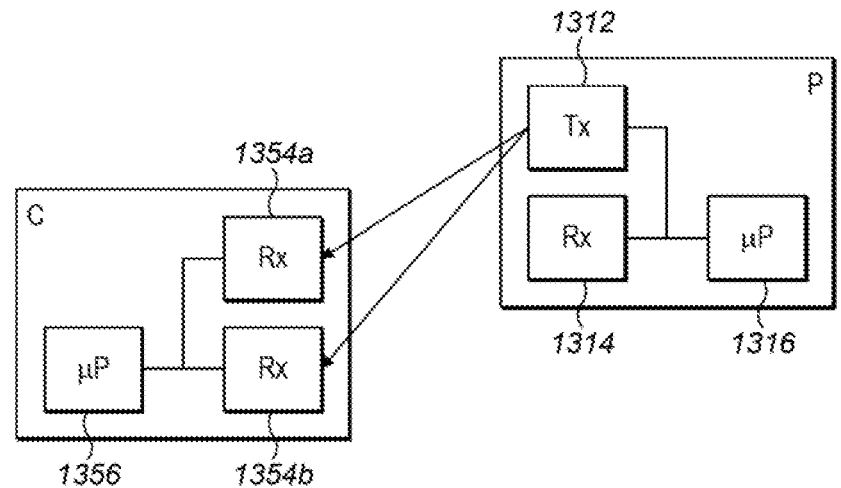
FIG. 11 is a block diagram of an electronic device according to an embodiment of the second aspect of the invention.
Figure 12:
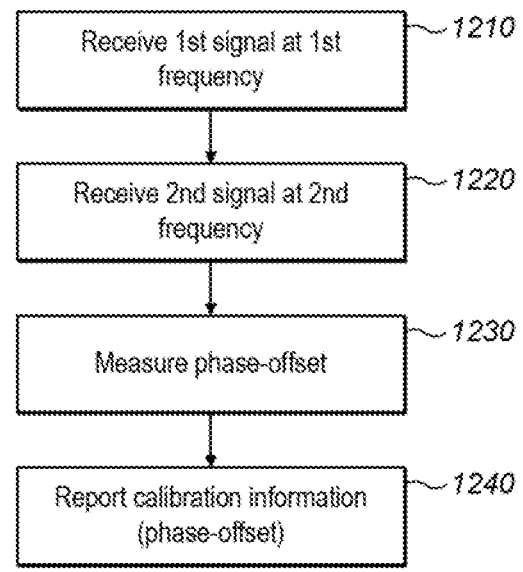
FIG. 12 is a flowchart illustrating a method of producing calibration information according to an embodiment of the second aspect.
Figure 13:
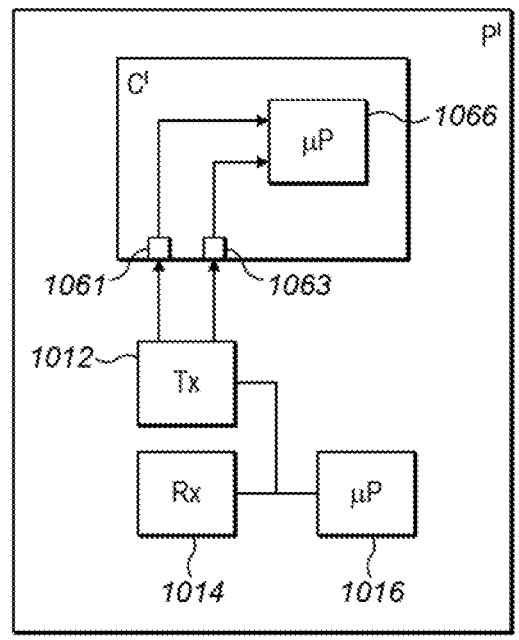
FIG. 13 is a block diagram of a wireless communication device incorporating an electronic device according to an embodiment of the third aspect of the invention.

FIGS. 11-13 relate to embodiments in which the calibration information is measured. FIG. 11 is a block diagram showing an electronic device C according to an embodiment of the second aspect of the invention, making calibration measurements on signals received from a transmitter 1312 of a wireless communications device P. The wireless communications device P may be similar in structure and function to the devices P (and Q) of FIGS. 7-9.

FIG. 12 is a flowchart illustrating a method performed by the electronic device C of FIG. 11. In step 1210, the receiver 1354a receives a first wireless signal transmitted at a first frequency by the transmitter 1312. In step 1220, the receiver 1354b receives a second wireless signal transmitted at a second frequency by the transmitter 1312. As before, the first frequency and second frequency are different. The receivers 1354a and 1354b are depicted here as two separate receivers, which is one possible implementation. Alternatively, they may be provided by a single receiver with a wider reception bandwidth. (In exactly the same way, the transmitter 1312 may be provided as a single wideband transmitter as shown in the drawings, or may be provided as to separate narrowband transmitters.)

In step 1230, a processor 1356 of the electronic device C measures a phase-offset between the received first wireless signal and the received second wireless signal. It then forms calibration information comprising this measured phase-offset and an associated calibration reference time at which it is valid. This calibration information is reported in step 1240. The calibration information may be reported to a remote supporting service 790, which stores it in a database. This remote supporting service 790 may be integrated with the positioning engine 780 or may be provided separately from it.

Note that, in order to correctly calibrate the phase offset between the signals at the first frequency second frequency, the electronic device C should be at a known distance from the transmitter 1312 when it makes the phase measurements. This can be calculated if the positions of the electronic device C and the device P are known—though knowledge of the positions is not essential, in general. Knowledge of the distance from the transmitter 1312 can be used to establish the phase-offset at the point of transmission and the corresponding calibration reference time.

An alternative approach to measuring the calibration information is illustrated in FIG. 13. This is a block diagram of an electronic device C' according to an embodiment of the third aspect of the invention. This device C' is embedded in a wireless communications device P', which is otherwise similar in structure and function to those devices P (and Q) described earlier.

The electronic device C' operates on a similar principle to the device C of the second aspect, with the difference that the electronic device C' of the third aspect is embedded at the transmitter instead of being remote from it. Accordingly, the electronic device C' comprises a first input 1061 coupled to the transmitter 1012 of the device P' and configured to obtain the first wireless signal being transmitted by this transmitter. Likewise, it comprises a second input 1063 coupled to the transmitter 1012, configured to obtain the second wireless signal being transmitted. These two inputs are connected to a processor 1066 configured to produce the calibration information by determining the phase-offset between the two transmitted wireless signals. As before, the calibration information comprises the determined phase offset and an associated calibration reference time at which it is valid. Thus, the processor 1066 carries out analogous steps of measuring 1230 and reporting 1240 the calibration information, similarly to the method of the second aspect. Since the electronic device C' of the third aspect is embedded at the transmitter, there is no need to wirelessly receive the first and second wireless signals and no need to compensate for the propagation phase delay of the wireless signals.

Note that, by retrofitting the electronic device C' to the device P', one arrives at a device that reports calibration information. In other embodiments, a device P or Q may be designed specifically to produce calibration information and report it to the remote supporting service 790. In contrast, the device P' may be a conventional device, such as a base station, that is modified to work according to an embodiment, by adding the electronic device C'.

In another alternative approach, according to a seventh aspect of the invention, two receiving devices A and B may be used to determine calibration information relating to a transmitting device P (or Q). To do this, first phase information and second phase information is obtained, just as in steps 1110 and 1120 of FIG. 10, but in this case with the devices A and B in known locations relative to P and Q. The two pieces of phase information are compared, just as in step 1130, to produce phase comparison information. Because the locations of A and B are known relative to P and Q, this phase comparison information provides the desired calibration information about the relative phases.

In some cases the locations of A and B (and possibly also P and Q) are known in absolute terms (for example, known geographic coordinates). However, it is not essential for the locations of A and B to be known absolutely. In general, it is sufficient that the positioning engine 780 should be able to determine the component of the phase comparison information that is dependent on the distance from the transmitting multi-frequency device P (or Q) to each of the first and second wireless communication devices A and B, respectively. Or, at least, it should be able to determine the relative effect of these distances on the phases of the wireless signals as received at the receivers of A and B, respectively. These conditions will be understood by the skilled person from a study of the equations given in "Method 3" above.

In one special case, in an embodiment using two transmitting devices P and Q (FIG. 8 and Method 3 above), two receiving devices A and B in known locations can be used for calibration without needing to explicitly quantify the phase-difference between the two (different frequency) signals transmitted by each individual transmitter. Instead, it is sufficient to quantify the "difference between the differences" of their phases.

Figure 14:
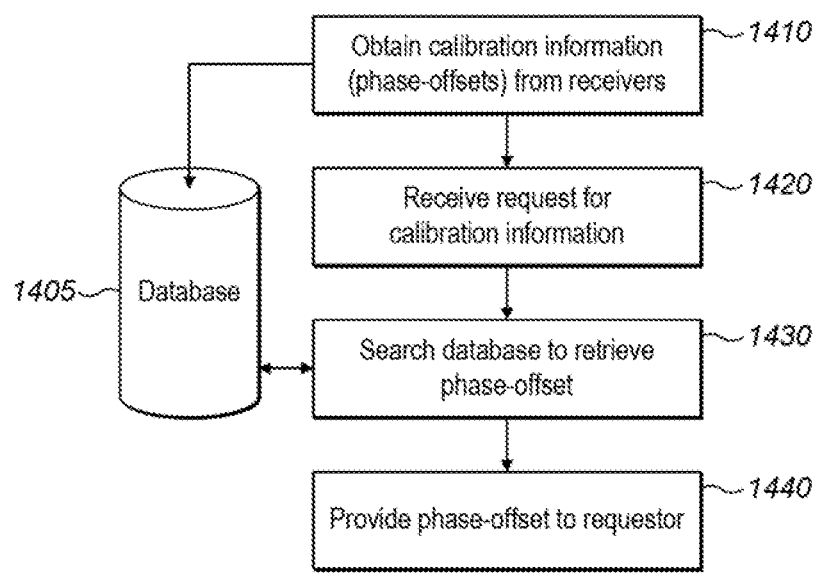
FIG. 14 is a flowchart illustrating a method of providing calibration information, according to an embodiment of the fourth aspect of the invention.

FIG. 14 illustrates a method of providing calibration information, according to an embodiment of the fourth aspect of the invention. This method may be performed by the remote supporting service 790 mentioned previously. In step 1410, the supporting service maintains a database 1405 of calibration information. This calibration information may be gathered when it is reported by devices according to embodiments of the second and third aspects. Maintaining the database comprises obtaining the calibration information (in particular, phase-offsets and associated calibration reference times) from calibration receivers or embedded calibration devices as described above. In step 1420, the remote supporting service 790 receives a request for calibration information relating to a particular transmitter 1012 or 1312 recorded in the database 1405. The remote supporting service 790 searches the database 1405 in step 1430, to retrieve the relevant phase-offset for the specified transmitter 1012 or 1312. The phase-offset may be retrieved along with an associated calibration reference time. Alternatively, all of the phase-offsets stored in the database may be referred to a common calibration reference time for more efficient storage.

In step 1440, the remote supporting service 790 provides the retrieved phase-offset to the requester (optionally together with the calibration reference time, if this is not implicit). The requester will usually be a device implementing the positioning (or timing) calculation according to an embodiment of the first aspect of the invention. For example, the requester may be the positioning engine 780. The requester can then use the provided calibration information in the calculation of a position and/or time.

Figure 15:
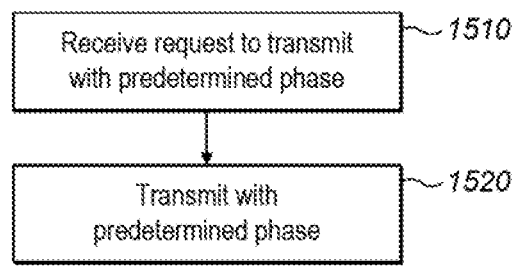
FIG. 15 is a flowchart illustrating a method of transmitting wireless signals according to an embodiment of the fifth aspect of the invention.
Figure 16:
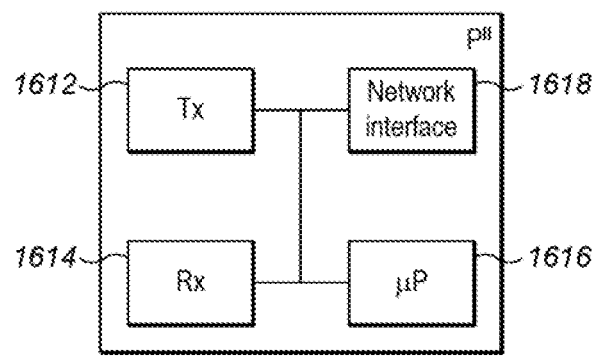
FIG. 16 is a block diagram of an electronic device configured to carry out the method of FIG. 15.

FIGS. 15 and 16 relate to an embodiment in which the transmission of the first and second wireless signals is controlled so that they have a predetermined phase between them at a predefined time. FIG. 15 is a flowchart illustrating a method according to an embodiment of the fifth aspect of the invention. FIG. 16 is a block diagram of an electronic device configured to carry out the method.

The electronic device P''' is similar in structure and function to those devices P, P', and Q described above, with the addition of a network interface 1618. In step 1510, the device P''' receives, via this interface 1618, a request to transmit wireless signals. The request includes a predetermined phase difference and a predefined time. In step 1520, the processor 1616 of the device P''' controls the transmitter 1612 to transmit a first wireless signal at a first frequency and a second wireless signal at a second, different frequency, such that they exhibit the predetermined phase difference at the predefined time. The request in step 1510 may be received from a remote supporting service 790. The remote supporting service 790 may store the predetermined phase difference and the predefined time in its database 1405. In this way, calibration information can be provided in the database, potentially without the need for the electronic device P''' to actively report it back to the supporting service 790. Nevertheless, in some embodiments, it may be desirable for the electronic device P''' to also report the transmitted phase difference and reference time (similarly to the device P') to provide confirmation and increased confidence in the accuracy of the transmitted phase.

Figure 17:
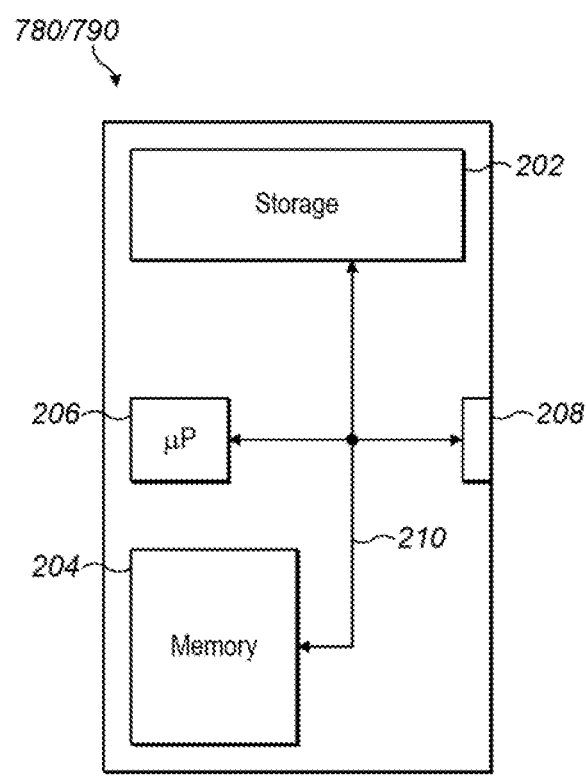
FIG. 17 is a block diagram of a server computer suitable for use in embodiments of the invention.

FIG. 17 is a block diagram of an exemplary server computer operating according to an embodiment. This may implement the functions of the positioning engine 780 and/or the remote supporting service 790. For simplicity, it will be assumed below that both the remote server 780 and the remote supporting service 790 are implemented by the same server computer. Of course, this is not essential and the scope of the invention is not limited in this way.

The exemplary server 780/790 comprises a computer-readable storage medium 202, a memory 204, a processor 206 and one or more interfaces 208, which are all linked together over one or more communication busses 210. The exemplary server 180/190 may take the form of a conventional computer system, such as, for example, a desktop computer, a personal computer, a laptop, a server, a mainframe computer, and so on.

The computer-readable storage medium 202 and/or the memory 204 may store one or more computer programs (or software or code) and/or data. The computer programs stored in the computer-readable storage medium 202 may include an operating system for the processor 206 to execute in order for the server 780/790 to function. The computer programs stored in the computer-readable storage medium 202 and/or the memory 204 may include computer programs according to embodiments of the invention or computer programs that, when executed by the processor 206, cause the processor 206 to carry out a method according to an embodiment of the invention.

The processor 206 may be any data processing unit suitable for executing one or more computer readable program instructions, such as those belonging to computer programs stored in the computer-readable storage medium 202 and/or the memory 204. As part of the execution of one or more computer-readable program instructions, the processor 206 may store data to and/or read data from the computer-readable storage medium 202 and/or the memory 204. The processor 206 may comprise a single data processing unit or multiple data processing units operating in parallel or in cooperation with each other.

The one or more interfaces 208 may comprise a network interface enabling the server 780/790 to communicate with the devices P, Q, A, and B across the network 200. The network may be any kind of network suitable for transmitting or communicating data from one computer system to another. For example, the network could comprise one or more of a local area network, a wide area network, a metropolitan area network, the internet, a wireless communications network, and so on. The server 780/790 may communicate with other computer systems over the network via any suitable communication mechanism/protocol. The processor 206 may communicate with the network interface via the one or more communication busses 210 to cause the network interface to send data and/or commands to another computer system over the network 100. Similarly, the one or more communication busses 210 enable the processor 206 to operate on data and/or commands received by the server 180/190 via the network interface from other computer systems over the network.

It will be appreciated that the architecture of the server 780/790 illustrated in FIG. 17 and described above is merely exemplary and that systems having different architectures using alternative components or using more components (or fewer) may be used instead.

According to an embodiment of the eighth aspect of the invention, related to the fifth aspect, the server implements a supporting service 790 supporting positioning and/or timing measurements. According to one such embodiment, the processor 206 is configured to generate an instruction for at least one electronic device P''', to cause that device P''' to transmit first and second wireless signals at respective different first and second frequencies. The processor 206 sends the instruction to the device P''' via the interface 208 and network 200. The instruction comprises a request to transmit the two wireless signals, a predetermined phase difference, and a predefined time at which the phase-difference should be valid. The device P''' receives the instruction and transmits the signals accordingly (see FIGS. 15-16).

According to an embodiment of the first aspect of the invention, the server implements a positioning engine 780 for positioning and/or timing calculations. According to one such embodiment, the processor 206 is configured to carry out a method as illustrated in FIG. 10 and described above.

While the invention has been described above by way of example with reference to specific embodiments, those skilled in the art will appreciate that various modifications are possible.

Where the foregoing examples refer to calculating a position, the position to be calculated may be that of any of the devices A, B, or P. In some embodiments, the positions of several of the devices may be calculated. This is possible, in general, as long as a greater number of independent measurements is available than there are unknown variables to solve in the set of equations.

In some embodiments, it may be desirable to calculate a velocity and/or timing-drift alternatively or in addition to a position and/or time. This can be done by obtaining Doppler information—information about the rate of change of the carrier phases. In particular, the positioning engine may calculate the rate of change (with respect to time) of the phase difference between the first and second phases. In one embodiment, this may be done by each receiver measuring the rate of change of the wireless signal that it receives. These rates are reported to the positioning engine, which subtracts one from the other, to calculate the rate of change of the difference. It will be clear to those skilled in the art that the rate of change of phase difference will give a rate of change of distance corresponding to the traversal of the phase wavefronts in FIG. 2.

In the embodiments described above, the ultimate goal of each method was to calculate a position, with the time being known in each example embodiment. However, it is also possible to calculate time in a similar way. For example, the method of FIG. 10 can be adapted so that the time is one of the unknown variables in the system of simultaneous equations constructed in step 1150. This may be instead of or in addition to the position being unknown. In the same way that methods of calculating position are useful, to determine the precise position of an electronic device, methods of calculating time are also useful for precise time-synchronisation—both to support accurate positioning and to support other applications. The use of a number of such measurements and equations to jointly estimate both the position and time of an electronic device is particularly helpful when the time at the device is not known accurately. The value of this can be appreciated when it is realised that, for precise positioning, a clock accuracy comparable to the desired position accuracy (scaled by the speed of light) would be required. This is a demanding and often unrealistic requirement for a small, inexpensive or mobile device.

The embodiments described above have each used phase difference as the operative measurement for assisting positioning or timing calculations. This may be advantageous (for instance, it may be possible in certain circumstances to measure phase-difference without needing to directly measure the individual phases of the carrier signals concerned); however, it is not essential. In other embodiments, individual phase measurements may be used instead of phase differences. In these embodiments, the comparison of phases may be implicit rather than explicit. An implicit comparison may involve individual phase measurements being incorporated in a system of equations that may be solved for position and/or time, without needing to explicitly form a phase difference or other phase comparison. The same is true of the calibration information—individual reference phases of pairs of signals may be stored explicitly, instead of storing phase-offsets. That is, the calibration information may comprise a phase of the first wireless signal and a phase of the second wireless signal at respective calibration reference times, instead of a phase-offset.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The invention claimed is:

1. A method for assisting a determination of a position or a time, the method comprising:
   obtaining first phase information, the first phase information characterizing a first phase of a first wireless signal transmitted by a transmitter at a first frequency and received by a first receiver at a first location;
   obtaining second phase information, the second phase information characterizing a second phase of a second wireless signal transmitted by the transmitter at a second frequency and received by a second receiver at a second location, wherein the second frequency is different from the first frequency and the second location is different from the first location;
   comparing the first phase information with the second phase information to produce phase comparison information; and
   using the phase comparison information to assist in the determination of the position or the time.

2. The method of claim 1, wherein
   the first phase information is obtained from the first receiver; and
   the second phase information is obtained from the second receiver.

3. The method of claim 1, wherein:
   at least one of the first wireless signal or the second wireless signal is received by the first or the second, respectively receiver, at a measurement reference time;
   wherein the method comprises using the phase comparison information and the measurement reference time to assist in the determination of the position or the time.

4. The method of claim 1, wherein:
   the first receiver is comprised in a first wireless communications device, the first wireless communications device further comprising a second transmitter;
   the first phase information further includes a phase of a first return signal, received at the transmitter from the first wireless communications device, wherein the first return signal is transmitted by the second transmitter,
   the first phase information comprising at least one of:
      a phase difference at the first wireless communications device between the reception of the first wireless signal and the transmission of the first return signal; and
      a phase difference at the transmitter between the reception of the first return signal and the transmission of the first wireless signal,
   the method comprising using the phase comparison information is used to assist in the determination of a position.

5. The method of claim 1, wherein at least one of the following is true:
   the first phase information comprises a phase-comparison at the first receiver between the first phase and a first reference phase of a reference signal at the first receiver; or
   the second phase information comprises a phase-comparison at the second receiver between the second phase and a second reference phase of a reference signal at the second receiver (934).

6. The method of claim 5, wherein the reference signal is transmitted by a reference transmitter at a third frequency, different from the first frequency and the second frequency.

7. The method of claim 1, wherein:
the first phase information comprises a phase-comparison at the first receiver between the first phase and a third phase of a third wireless signal transmitted by a further transmitter at the first frequency and received at the first receiver,
the method comprising using the phase comparison information to assist in the determination of a position.

8. The method of claim 1, further comprising obtaining calibration information,
wherein using the phase comparison information to assist in the calculation of the position or the time also uses the calibration information,
wherein the calibration information comprises at least one of:
a phase of the first wireless signal and a phase of the second wireless signal, at respective associated calibration reference times; or
a phase-offset between the first wireless signal and the second wireless signal, at an associated calibration reference time.

9. The method of claim 8, wherein the calibration information is obtained from a database.

10. The method of claim 1, further comprising:
measuring a first time-of-arrival of the first wireless signal at the first receiver;
measuring a second time-of-arrival of the second wireless signal at the second receiver; and
using the measured first and second times of arrival to assist in the calculation of the position or time.

11. The method of claim 1, further comprising:
obtaining Doppler information, said obtaining comprising determining a rate of change of the phase comparison information, wherein the Doppler information comprises the determined rate of change; and
using the obtained Doppler information to assist in the calculation of a velocity or timing drift.

12. The method of claim 1, further comprising:
wherein each of the first wireless signal and the second wireless signal is received at a known distance from the transmitter at a known calibration time,
the method further comprising producing calibration information, said producing comprising at least one of:
measuring a first phase of the received first wireless signal and a second phase of the received second wireless signal, wherein the calibration information comprises the measured first phase and the measured second phase, and
determining (1230) a phase-offset between the first wireless signal and the second wireless signal, wherein the calibration information comprises the determined phase-offset,
the calibration information further comprising at least one associated calibration reference time and comprising the known distance for each signal.

13. The method of claim 9, wherein obtaining calibration information comprises triggering calibration measurements if there is insufficient calibration information in the database.

14. The method of of claim 1, further comprising:
receiving a request to transmit wireless signals, the request including a predetermined phase difference and a predefined time; and
in response to the request:
transmitting (1520), by the transmitter, the first wireless signal at the first frequency; and
transmitting (1520), by the transmitter, the second wireless signal at the second frequency, different from the first frequency,
wherein the first wireless signal and the second wireless signal are transmitted so as to have the predetermined phase difference between them at the predefined time.

15. The method of claim 1, wherein a component of the phase comparison information that is dependent on a distance between the transmitter and the first receiver and a distance between the transmitter and the second receiver is known;
wherein the calibration information comprises the phase comparison information.

16. The method of claim 15, wherein:
the first phase information comprises a phase-comparison at the first receiver between the first phase and a third phase of a third wireless signal transmitted by a further transmitter at the first frequency and received at the first receiver; and
the second phase information comprises a phase-comparison at the second receiver between the second phase and a fourth phase of a fourth wireless signal transmitted by the further transmitter at the second frequency and received at the second receiver.

17. The method of claim 1, wherein the first frequency differs from the second frequency by one of at least 2 kHz, least 100 kHz, least 1 MHz, or at least 10 MHz.

18. The method of claim 1, wherein the first wireless signal and the second wireless signal are transmitted by the transmitter at different times.

19. An electronic device configured to produce calibration information for assisting in a determination of a position or a time, the electronic device comprising:
a first receiver configured to receive a first wireless signal transmitted at a first frequency by a transmitter;
a second receiver, configured to receive a second wireless signal transmitted at a second frequency by the transmitter, wherein the second frequency is different from the first frequency,
wherein each of the first and second wireless signals is received at a known distance from the transmitter at a known calibration time, and
a processor, configured to produce calibration information, by at least one of:
measuring a first phase of the received first wireless signal and a second phase of the received second wireless signal, wherein the calibration information comprises the measured first phase and the measured second phase, and
determining a phase-offset between the first wireless signal and the second wireless signal, wherein the calibration information comprises the determined phase-offset,
the calibration information further comprising at least one associated calibration reference time.

20. An electronic device configured to produce calibration information for assisting in a determination of a position or a time, the electronic device comprising:
a first input for coupling to a transmitter and obtaining a first wireless signal being transmitted at a first frequency by the transmitter;
a second input for coupling to the transmitter and obtaining a second wireless signal being transmitted at a second frequency by the transmitter, wherein the second frequency is different from the first frequency; and
a processor, configured to produce calibration information, by at least one of:

measuring a first phase of the transmitted first wireless signal and a second phase of the transmitted second wireless signal, wherein the calibration information comprises the measured first phase and the measured second phase, and determining a phase-offset between the transmitted first wireless signal and the transmitted second wireless signal, wherein the calibration information comprises the determined phase-offset, the calibration information further comprising at least one associated calibration reference time.

* * * * *